US010402416B2

(12) United States Patent
Unagami et al.

(10) Patent No.: US 10,402,416 B2
(45) Date of Patent: Sep. 3, 2019

(54) INFORMATION PROVISION METHOD

(71) Applicant: Panasonic Intellectual Property Corporation of America, Torrance, CA (US)

(72) Inventors: Yuji Unagami, Osaka (JP); Natsume Matsuzaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 628 days.

(21) Appl. No.: 14/893,202

(22) PCT Filed: Jun. 3, 2014

(86) PCT No.: PCT/JP2014/002947
§ 371 (c)(1),
(2) Date: Nov. 23, 2015

(87) PCT Pub. No.: WO2014/196192
PCT Pub. Date: Dec. 11, 2014

(65) Prior Publication Data
US 2016/0125045 A1    May 5, 2016

(30) Foreign Application Priority Data

Jun. 6, 2013   (JP) ................. 2013-119822

(51) Int. Cl.
*G06F 16/248*   (2019.01)
*H04L 29/06*   (2006.01)
(Continued)

(52) U.S. Cl.
CPC ........ *G06F 16/248* (2019.01); *H04L 12/2809* (2013.01); *H04L 12/2825* (2013.01);
(Continued)

(58) Field of Classification Search
CPC ......... G06F 17/30864; G06F 17/30867; G06F 17/30991; G06F 17/30696;
(Continued)

(56) References Cited

U.S. PATENT DOCUMENTS 7,809,786 B2   10/2010   Yoon et al.
2001/0051930 A1*   12/2001   Nakamura .............. G06F 21/10
705/56
(Continued)

FOREIGN PATENT DOCUMENTS

EP   1 217 475   6/2002
JP   11-194999   7/1999
(Continued)

OTHER PUBLICATIONS

International Search Report dated Aug. 19, 2014 in International (PCT) Application No. PCT/JP2014/002947.

*Primary Examiner* — Michael Pham
(74) *Attorney, Agent, or Firm* — Wenderoth, Lind & Ponack, L.L.P.

(57)          ABSTRACT

An information provision method includes accumulating, in a first database, a first identifier identifying each of one or more service providers, and first device information indicating an electrical device to be designated by each of the one or more service providers in association with each other; accumulating, in a second database, a second identifier identifying each of one or more users, and second device information indicating an electrical device to be used by the one or more users in association with each other; extracting a service provider associated with the first device information when the second device information is updated by addition of a new electrical device to be used by one of the
(Continued)

one or more users, and when the new electrical device is included in the electrical devices indicated by the first device information.

9 Claims, 29 Drawing Sheets

(51) Int. Cl.
*H04L 12/28* (2006.01)
*G06F 21/62* (2013.01)

(52) U.S. Cl.
CPC ........ *H04L 63/101* (2013.01); *G06F 21/6245* (2013.01); *G06F 2221/2117* (2013.01); *H04L 63/0272* (2013.01); *H04L 63/0823* (2013.01); *H04L 63/166* (2013.01)

(58) Field of Classification Search
CPC ............. G06F 222/2117; G06F 16/248; G06F 21/6245; G06Q 30/02; H04L 12/2809; H04L 12/2825; H04L 63/101; H04L 63/166; H04L 63/0823; H04L 63/0272
USPC ........................................................ 707/722
See application file for complete search history.

(56) References Cited

U.S. PATENT DOCUMENTS

| | | | | |
|---|---|---|---|---|
| 2002/0049914 | A1* | 4/2002 | Inoue | G06F 21/31 726/6 |
| 2004/0143661 | A1* | 7/2004 | Higashi | G06F 21/10 709/224 |
| 2006/0053219 | A1* | 3/2006 | Kutsumi | G06Q 30/02 709/224 |
| 2007/0208863 | A1* | 9/2007 | Otsuka | H04N 1/00222 709/227 |
| 2009/0099967 | A1 | 4/2009 | Yokota et al. | |
| 2010/0185764 | A1 | 7/2010 | Kondo et al. | |
| 2013/0014225 | A1* | 1/2013 | Kageyama | H04L 67/16 726/4 |
| 2015/0195158 | A1* | 7/2015 | Nakano | H04L 43/04 709/224 |

FOREIGN PATENT DOCUMENTS

| | | |
|---|---|---|
| JP | 2004-96591 | 3/2004 |
| WO | 2009/041668 | 4/2009 |

\* cited by examiner

FIG.4

| USER ID | HOME APPLIANCE TYPE | HOME APPLIANCE HISTORY INFORMATION |
|---|---|---|
| ID11 | BODY COMPOSITION METER | 2012.1.1  BODY WEIGHT: 55 KG, BODY FAT PERCENTAGE: 18%<br>2012.1.3  BODY WEIGHT: 56 KG, BODY FAT PERCENTAGE: 19%<br>... |
| | TV RECEIVER | 2012.1.1  18:00 DRAMA, 20:00 NEWS<br>2012.1.3  10:00 ANIMATION, 13:00 DRAMA<br>... |
| | ... | |
| ID12 | BODY COMPOSITION METER | 2011.12.30  BODY WEIGHT: 80 KG, BODY FAT PERCENTAGE: 22%<br>2012.1.3   BODY WEIGHT: 82 KG, BODY FAT PERCENTAGE: 22%<br>... |
| | ... | |
| ID13 | BODY COMPOSITION METER | |
| ... | | |

ACCESS CONTROL LIST

| SERVICE PROVIDER ID | HOME APPLIANCE TYPE | UNPROVIDABLE USER ID |
|---|---|---|
| SID_a (FITNESS SERVICE A) | BODY COMPOSITION METER | |
| | TV RECEIVER | |
| | BLOOD PRESSURE METER | |
| SID_b (DIET SERVICE B) | BODY COMPOSITION METER | |

FIG.13

INPUT INFORMATION OF HOME APPLIANCE TO BE REGISTERED

INPUT HOME APPLIANCE ID

INPUT PLACE WHERE YOU
USE HOME APPLIANCE

SEND

FIG.14

YOU CAN PROVIDE INFORMATION OF REGISTERED HOME APPLIANCE TO SERVICE PROVIDERS

| REGISTERED HOME APPLIANCE | SERVICE PROVIDER | INFORMATION TO BE PROVIDED | | |
|---|---|---|---|---|
| BODY COMPOSITION METER | FITNESS SERVICE A | MEASUREMENT DATE, BODY WEIGHT, BODY FAT PERCENTAGE | ☐ PROVIDE | ☐ NOT PROVIDE |
| | DIET SERVICE B | MEASUREMENT DATE, BODY WEIGHT, BODY FAT PERCENTAGE | ☐ PROVIDE | ☐ NOT PROVIDE |

SEND

FIG.15

ACCESS CONTROL LIST

| SERVICE PROVIDER ID | HOME APPLIANCE TYPE | UNPROVIDABLE USER ID |
|---|---|---|
| SID_a (FITNESS SERVICE A) | BODY COMPOSITION METER | ID13 |
| | TV RECEIVER | |
| | BLOOD PRESSURE METER | ID14 |
| SID_b (DIET SERVICE B) | BODY COMPOSITION METER | |

FIG.20

ACCESS CONTROL LIST

| SERVICE PROVIDER ID | HOME APPLIANCE TYPE | UNPROVIDABLE USER ID |
|---|---|---|
| SID_a (FITNESS SERVICE A) | BODY COMPOSITION METER | ID13 |
| | TV RECEIVER | |
| | BLOOD PRESSURE METER | |
| SID_b (DIET SERVICE B) | BODY COMPOSITION METER | ID14 |
| SID_c (INSURANCE SERVICE C) | BODY COMPOSITION METER | |
| | BLOOD PRESSURE METER | |

FIG.21

YOU CAN PROVIDE INFORMATION OF REGISTERED HOME APPLIANCE TO NEW SERVICE PROVIDER

| NEW SERVICE PROVIDER | REGISTERED HOME APPLIANCE | INFORMATION TO BE PROVIDED | | |
|---|---|---|---|---|
| INSURANCE SERVICE C | BODY COMPOSITION METER | MEASUREMENT DATE, BODY WEIGHT, BODY FAT PERCENTAGE | ☐ PROVIDE | ☐ NOT PROVIDE |
| | BLOOD PRESSURE METER | MEASUREMENT DATE, BLOOD PRESSURE, PULSE RATE | ☐ PROVIDE | ☐ NOT PROVIDE |

[ SEND ]

FIG.22

ACCESS CONTROL LIST

| SERVICE PROVIDER ID | HOME APPLIANCE TYPE | UNPROVIDABLE USER ID |
|---|---|---|
| SID_a (FITNESS SERVICE A) | BODY COMPOSITION METER | ID13 |
| | TV RECEIVER | |
| | BLOOD PRESSURE METER | |
| SID_b (DIET SERVICE B) | BODY COMPOSITION METER | ID14 |
| SID_c (INSURANCE SERVICE C) | BODY COMPOSITION METER | ID14 |
| | BLOOD PRESSURE METER | ID14 |

FIG.23

YOU CAN PROVIDE INFORMATION OF REGISTERED HOME APPLIANCE TO SERVICE PROVIDERS

| REGISTERED HOME APPLIANCE | SERVICE PROVIDER | INFORMATION TO BE PROVIDED | | |
|---|---|---|---|---|
| BODY COMPOSITION METER | FITNESS SERVICE A | MEASUREMENT DATE | ☐ PROVIDE | ☐ NOT PROVIDE |
| | | BODY WEIGHT | ☐ PROVIDE | ☐ NOT PROVIDE |
| | | BODY FAT PERCENTAGE | ☐ PROVIDE | ☐ NOT PROVIDE |
| | DIET SERVICE B | MEASUREMENT DATE | ☐ PROVIDE | ☐ NOT PROVIDE |
| | | BODY WEIGHT | ☐ PROVIDE | ☐ NOT PROVIDE |
| | | BODY FAT PERCENTAGE | ☐ PROVIDE | ☐ NOT PROVIDE |

[ SEND ]

FIG.24

YOU CAN PROVIDE INFORMATION OF REGISTERED HOME APPLIANCE TO SERVICE PROVIDERS

| REGISTERED HOME APPLIANCE | SERVICE PROVIDER | INFORMATION TO BE PROVIDED | |
|---|---|---|---|
| BODY COMPOSITION METER | FITNESS SERVICE A | MEASUREMENT DATE, BODY WEIGHT, BODY FAT PERCENTAGE | ☐ PROVIDE ☐ NOT PROVIDE |
| | ※NUMBER OF USERS PROVIDING HOME APPLIANCE INFORMATION TO FITNESS SERVICE A IS X | | |
| | DIET SERVICE B | MEASUREMENT DATE, BODY WEIGHT, BODY FAT PERCENTAGE | ☐ PROVIDE ☐ NOT PROVIDE |
| | ※NUMBER OF USERS PROVIDING HOME APPLIANCE INFORMATION TO DIET SERVICE B IS Y | | |

SEND

FIG.25

YOU CAN PROVIDE INFORMATION OF REGISTERED HOME APPLIANCE TO SERVICE PROVIDERS

| REGISTERED HOME APPLIANCE | SERVICE PROVIDER | INFORMATION TO BE PROVIDED | | |
|---|---|---|---|---|
| BODY COMPOSITION METER | FITNESS SERVICE A | MEASUREMENT DATE, BODY WEIGHT, BODY FAT PERCENTAGE | ■ PROVIDE ☐ NOT PROVIDE | |
| | | INFORMATION IS PROVIDED FOR THE FOLLOWING PERIOD | 2012/01/01 ~ 2013/01/01 | |
| | DIET SERVICE B | MEASUREMENT DATE, BODY WEIGHT, BODY FAT PERCENTAGE | ☐ PROVIDE ☐ NOT PROVIDE | |

SEND

FIG.26

NUMBER OF USERS PROVIDING HOME APPLIANCE INFORMATION TO THE FOLLOWING SERVICE PROVIDERS IS X
YOU CAN PROVIDE INFORMATION OF REGISTERED HOME APPLIANCE TO SERVICE PROVIDERS

| REGISTERED HOME APPLIANCE | SERVICE PROVIDER | INFORMATION TO BE PROVIDED | | |
|---|---|---|---|---|
| BODY COMPOSITION METER | FITNESS SERVICE A | MEASUREMENT DATE, BODY WEIGHT, BODY FAT PERCENTAGE | ☐ PROVIDE | ☐ NOT PROVIDE |
| | DIET SERVICE B | MEASUREMENT DATE, BODY WEIGHT, BODY FAT PERCENTAGE | ☐ PROVIDE | ☐ NOT PROVIDE |

SEND

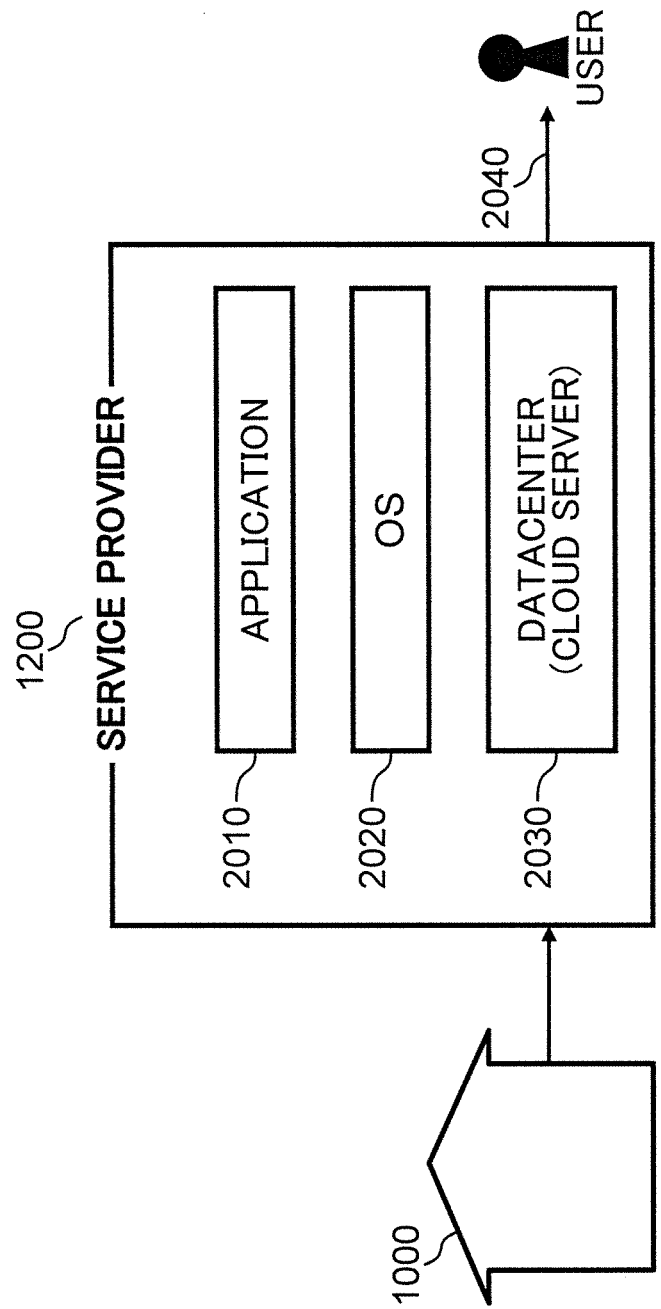

INFORMATION PROVISION METHOD

TECHNICAL FIELD

The present invention relates to an information provision method for use in an information providing system configured to collect log information from one or more electrical devices of one or more users via a first network, and to transmit the log information to a computer of one or more service providers via a second network.

BACKGROUND ART

In recent years, there is an expectation that devices such as home appliances or AV equipment in a home are connected to a cloud server via a cloud network, log information including operation histories of the devices is collected in the cloud server from the devices such as home appliances or AV equipment, and services are provided with use of the collected log information. For instance, there is proposed a system in which a datacenter operating company operating a cloud server cooperates with a service provider providing services, and the service provider utilizes log information collected by the cloud server, whereby personal services matching with the lifestyle of the user are provided, and a marketing analysis is carried out using statistical information.

Further, for instance, Patent Literature 1 discloses the information disclosing server 201 configured such that when public information requested from the client 202 includes attachment information, confirmation information indicating that the public information attached with the attachment information is provided is transmitted to the client 202, and when a reply indicating acceptance is obtained from the client 202, the public information attached with the attachment information relating to e.g. copyright is provided.

The aforementioned system, however, is under consideration. Further improvement is necessary to put the system into practice. For instance, log information to be collected includes personal information relating to the privacy of the user. In particular, personal information cannot be provided to a third party without permission of the user. User's permission is individually necessary in order to provide personal information.

CITATION LIST

Patent Literature

Patent Literature 1: Japanese Unexamined Patent Publication No. H11-194999

SUMMARY OF INVENTION

In view of the above, an object of the invention is to provide an information provision method that enables to prevent providing log information of a new electrical device to a service provider which is not expected to the user.

An information provision method according to an aspect of the invention is an information provision method for use in an information providing system configured to collect log information from one or more electrical device of one or more users via a first network, and to transmit the log information to a computer of one or more service providers via a second network. The information provision method includes accumulating, in a first database, a first identifier identifying each of the one or more service providers, and first device information indicating an electrical device to be designated by each of the one or more service providers in association with each other; accumulating, in a second database, a second identifier identifying each of the one or more users, and second device information indicating an electrical device to be used by the one or more users in association with each other; extracting the service provider associated with the first device information when the second device information is updated by addition of a new electrical device to be used by one of the one or more users, and when the new electrical device is included in the electrical devices indicated by the first device information; and providing, to a display terminal of the one user, first screen information indicating a setting screen, on which the one user is allowed to set whether log information of the new electrical device is transmitted to a computer of the extracted service provider.

BRIEF DESCRIPTION OF DRAWINGS

FIG. 4 is a diagram illustrating an example of data to be stored in a history information DB in the embodiment of the invention;

FIG. 13 is a diagram illustrating an example of a home appliance registration screen to be displayed when the home appliance registration process is performed in the embodiment of the invention;

FIG. 14 is a diagram illustrating an example of a provision confirmation screen for use in asking the user whether home appliance history information of a registered home appliance is to be provided to a service provider server;

FIG. 15 is a diagram illustrating an example of an access control list, which is set such that home appliance history information of a body composition meter is not provided by the user;

FIG. 20 is a diagram illustrating an example of an access control list, in which a new service provider is added;

FIG. 21 is a diagram illustrating an example of a provision confirmation screen for use in asking the user whether home appliance history information of a registered home appliance is to be provided to a newly registered service provider server;

FIG. 22 is a diagram illustrating an example of an access control list, in which setting as to whether home appliance history information is provided with respect to a newly registered service provider ID is made;

FIG. 23 is a diagram illustrating a first modification of the provision confirmation screen;

FIG. 24 is a diagram illustrating a second modification of the provision confirmation screen;

FIG. 25 is a diagram illustrating a third modification of the provision confirmation screen;

FIG. 26 is a diagram illustrating a fourth modification of the provision confirmation screen;

FIG. 27 is a diagram illustrating an overview of services to be provided by an information managing system of service type 1 (a cloud service provided by a datacenter of the applicant's company);

DESCRIPTION OF EMBODIMENTS

Figure 1:
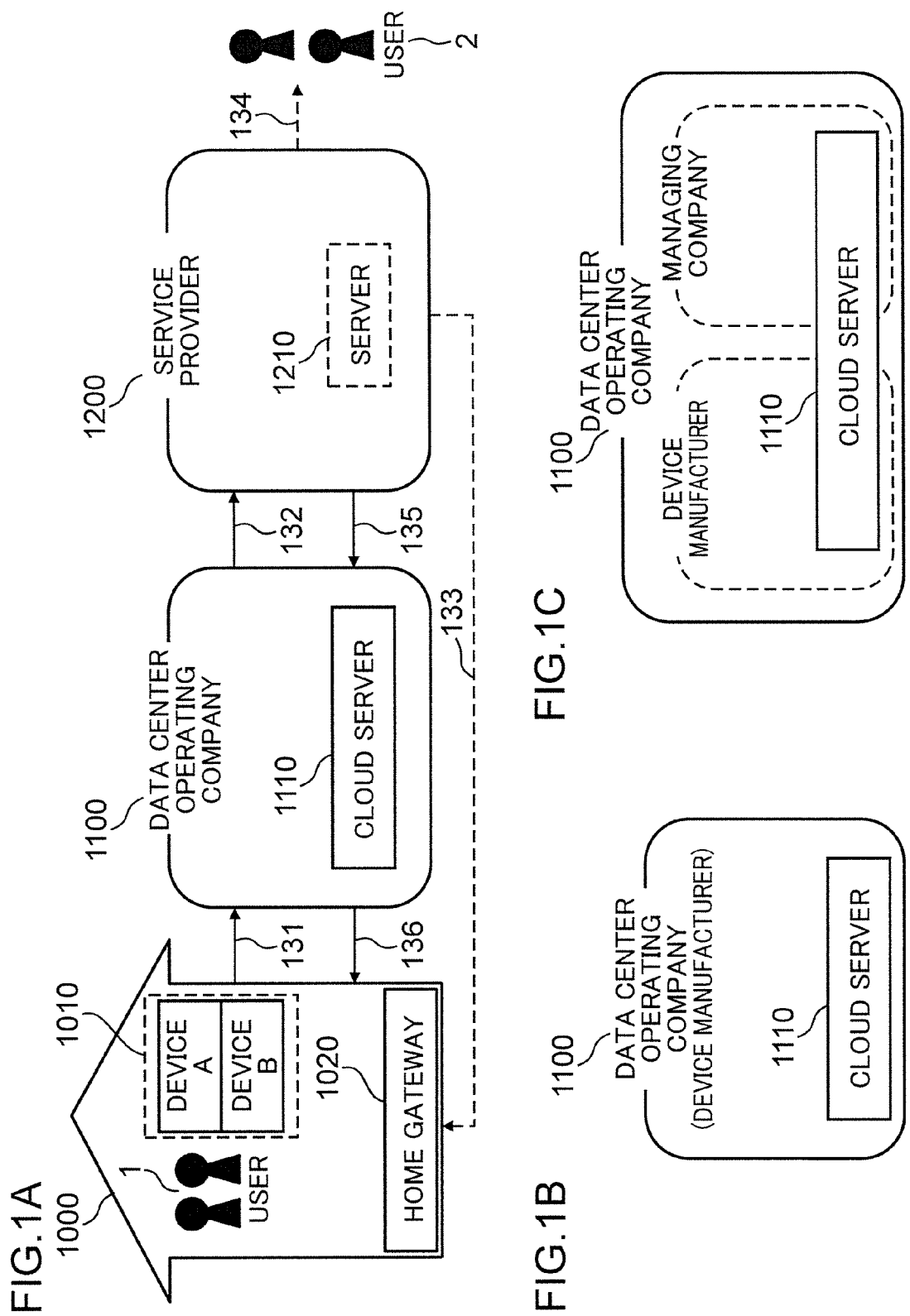
FIG. 1A is a diagram illustrating an overview of services to be provided by an information managing system in an embodiment of the invention.
FIG. 1B is a diagram illustrating an example, in which a device manufacturer corresponds to a datacenter operating company.
FIG. 1C is a diagram illustrating an example, in which both of or one of a device manufacturer and a managing company corresponds to a datacenter operating company.

The following matters are taken into consideration when the aforementioned conventional system is put into practice.

For instance, when the number of devices owned by the user and connectable to a network increases, it may be difficult for the user to discriminate between registration and non-registration as to whether log information is provided with respect to each of the devices. In this case, it may be difficult or impossible to appropriately manage the setting as to whether providing log information with respect to each of the devices. As a result, the user may inadvertently provide log information of a device of which providing information is not intended to a service provider.

Further, for instance, when the number of devices owned by the user and connectable to a network increases, it may be difficult for the user to discriminate between registration and non-registration as to to which one of the service providers, log information is to be provided with respect to each of the devices. In this case, for instance, it may be difficult or impossible to appropriately manage whether providing log information to a predetermined service provider is permitted. As a result, the user may inadvertently provide log information to a service provider to which providing log information is not intended.

In view of the above, the inventors have achieved the invention according to the following aspects on the basis of the aforementioned findings.

An information provision method according to an aspect of the invention is an information provision method for use in an information providing system configured to collect log information from one or more electrical devices of one or more users via a first network, and to transmit the log information to a computer of one or more service providers via a second network. The information provision method includes accumulating, in a first database, a first identifier identifying each of the one or more service providers, and first device information indicating an electrical device to be designated by each of the one or more service providers in association with each other; accumulating, in a second database, a second identifier identifying each of the one or more users, and second device information indicating an electrical device to be used by the one or more users in association with each other; extracting the service provider associated with the first device information when the second device information is updated by addition of a new electrical device to be used by one of the one or more users, and when the new electrical device is included in the electrical devices indicated by the first device information; and providing, to a display terminal of the one user, first screen information indicating a setting screen, on which the one user is allowed to set whether log information of the new electrical device is transmitted to a computer of the extracted service provider.

In the aforementioned aspect, when a new electrical device is added to the information providing system, the service provider which intends to acquire log information of the new electrical device is automatically extracted. Then, a display screen, on which the user is allowed to set whether log information of the new electrical device is to be provided to the computer of the extracted service provider, is provided to the display terminal of the user.

According to the aforementioned configuration, each time a new electrical device is added, the user is allowed to set the service provider to which log information of the new electrical device is provided. This makes it possible to prevent providing log information of a new electrical device to a service provider which is not expected to the user, without relying on the user's judgment. Further, each time a new electrical device is added, a service provider associated with the new electrical device is selected. This makes it possible to reduce the user's burden in setting. Further, each time a new electrical device is added, the user is asked to judge whether log information is to be provided. This makes it possible to prevent a case in which it is impossible to discriminate between home appliances registered whether log information is to be provided and home appliances unregistered whether log information is to be provided due to an increase in the number of registered electrical devices, and in which setting as to whether providing log information is erroneously registered.

Further, in the aforementioned aspect, preferably, it may be judged whether a same electrical device as the new electrical device included in the updated second device information is included in the electrical devices indicated by the first device information, and when it is judged that the same electrical device as the new electrical device is included in the electrical devices indicated by the first device information, the service provider associated with the first device information may be extracted.

According to the aforementioned configuration, it is judged whether the same electrical device as the new electrical device included in the updated second device information is included in the electrical devices indicated by the first device information. When it is judged that the same electrical device as the new electrical device is included in the electrical devices indicated by the first device information, a service provider associated with the first device information is extracted.

This makes it possible to specify the service provider which intends to acquire log information of a new electrical device.

Further, in the aforementioned aspect, preferably, when the first database is updated by addition of a new service provider, and when an electrical device to be designated by the new service provider is included in the electrical devices indicated by the second device information, a user associated with the second device information may be extracted from the one or more users, and second screen information indicating a setting screen, on which the associated user is allowed to set whether log information of the electrical device to be designated by the new service provider is transmitted to a computer of the new service provider, may be provided to a display terminal of the associated user.

According to the aforementioned configuration, when a computer of a new service provider is added to the information providing system, a display screen, on which the user is allowed to set whether log information is provided to the new service provider with respect to an electrical device of which acquisition of log information is intended by the new service provider, is provided to the display terminal of the user.

In the aforementioned configuration, each time a new service provider is added, the user is allowed to set whether log information of an electrical device is to be provided to the new service provider. This makes it possible to prevent providing log information of an electrical device to a new service provider which is not expected to the user, without relying on the user's judgment. Further, each time a new service provider is added, an electrical device associated with the new service provider is selected. This makes it possible to reduce the user's burden in setting. Further, each time a new service provider is added, the user is allowed to judge whether log information is to be provided. This makes it possible to prevent a case in which it is impossible to discriminate between home appliances registered whether log information is to be provided and home appliances unregistered whether log information is to be provided due to an increase in the number of registered electrical devices, and in which setting as to whether providing log information is erroneously registered.

Further, in the aforementioned aspect, preferably, the first screen information may include information indicating the number of users who permit transmitting log information of a same electrical device as the new electrical device to the computer of the same service provider as the extracted service provider.

According to the aforementioned configuration, it is possible to display information indicating the number of users who permit transmitting log information of the same electrical device as the new electrical device to the computer of the same service provider as the extracted service provider.

This makes it possible to determine whether transmitting log information is permitted by checking the number of the other users who permit transmitting log information. Further, the user can use the number of the other users who permit transmitting log information, as information in determining whether transmitting log information is to be permitted.

Further, in the aforementioned aspect, preferably, when the number of users who permit transmitting the log information to a computer of a specific one of the one or more service providers has reached a predetermined number among the one or more users, third screen information indicating a setting screen, on which a non-permitting user who does not permit transmitting the log information of the electrical device to the computer of the specific service provider among the one or more users is allowed to set whether the log information of the electrical device is transmitted to the computer of the specific service provider, is provided to a display terminal of the non-permitting user.

According to the aforementioned configuration, it is possible to provide a setting screen, on which the user is allowed to set whether log information of an electrical device is transmitted to the computer of the specific service provider, to the display terminal of a non-permitting user who does not permit transmitting log information of an electrical device to the computer of the specific service provider when the number of users who permit transmitting log information to the computer of the specific service provider has reached a predetermined number. This is advantageous in prompting the user to transmit log information.

Further, in the aforementioned aspect, preferably, the third screen information may include information indicating that the number of users who permit transmitting the log information to the computer of the specific service provider has reached the predetermined number.

According to the aforementioned configuration, the user can determine whether the user permits transmitting log information by checking the information indicating that the number of users who permit transmitting log information to the computer of the specific service provider has reached the predetermined number.

Further, in the aforementioned aspect, preferably, the first screen information may indicate a setting screen, on which the one user is allowed to set whether log information of the new electrical device is transmitted to the computer of the extracted service provider with respect to each of types of the log information.

According to the aforementioned configuration, it is possible to set whether log information is to be transmitted to the computer of the service provider with respect to each of the types of log information. This is advantageous in finely setting whether log information is to be provided to a service provider.

Further, in the aforementioned aspect, preferably, the first screen information may include a setting screen, on which the one user is allowed to set a time period during which the log information of the new electrical device is transmitted to the computer of the extracted service provider.

According to the aforementioned configuration, it is possible to set the time period during which log information is provided to the service provider. This makes it possible to provide log information to the service provider only during the time period intended by the user.

An information provision method according to another aspect of the invention is an information provision method for use in an information providing system configured to collect log information from one or more electrical devices of one or more users via a first network, and to transmit the log information to a computer of one or more service providers via a second network. The information provision method includes accumulating, in a first database, a first identifier identifying each of the one or more service providers, and first device information indicating an electrical device to be designated by each of the one or more service providers in association with each other; accumulating, in a second database, a second identifier identifying each of the one or more users, and second device information indicating an electrical device to be used by the one or more users in association with each other; extracting a user associated with the second device information from the one or more users when the first database is updated by addition of a new service provider, and when an electrical device to be designated by the new service provider is included in the electrical devices indicated by the second device information; and providing first screen information indicating a setting screen, on which the associated user is allowed to set whether log information of the electrical device to be designated by the new service provider is transmitted to a computer of the new service provider, to a display terminal of the associated user.

In the aforementioned aspect, when the computer of the new service provider is added to the information providing system, a display screen, on which the user is allowed to set whether log information is to be provided to the new service provider with respect to the electrical device of which acquisition of log information is intended by the new service provider.

According to the aforementioned configuration, each time a new service provider is added, the user is allowed to set whether log information of an electrical device is to be provided to the new service provider. This makes it possible to prevent providing log information of an electrical device to a new service provider which is not expected to the user, without relying on the user's judgment. Further, each time a new service provider is added, an electrical device associated with the new service provider is selected. This makes it possible to reduce the user's burden in setting. Further, each time a new service provider is added, the user is asked to judge whether log information is to be provided. This makes it possible to prevent a case in which it is impossible to discriminate between home appliances registered whether log information is to be provided and home appliances unregistered whether log information is to be provided due to an increase in the number of registered electrical devices, and in which setting as to whether providing log information is erroneously registered.

(Overview of Services to be Provided)

FIG. 1A is a diagram illustrating an overview of services to be provided by the information providing system in the embodiment. The information providing system is provided with a group 1000, a datacenter operating company 1100, and a service provider 1200.

The group 1000 is, for instance, a company, a party, or a home. The scale of the group 1000 does not matter. The group 1000 is provided with a number of devices 101 including a device A and a device B, and a home gateway 1020. The devices 1010 include devices (e.g. a smartphone, a personal computer (PC) or a TV receiver) connectable to the Internet, and devices (e.g. an illumination device, a washing machine, or a refrigerator) incapable of being connected to the Internet by themselves. The devices 1010 may include devices which are not connectable to the Internet by themselves, but are connectable to the Internet via the home gateway 1020. Further, users 1 use the devices 1010 within the group 1000.

The datacenter operating company 1100 is provided with a cloud server 1110. The cloud server 1110 is a virtual server connectable to a variety of devices via the Internet. The cloud server 1110 mainly manages big data, which is difficult to be handled by an ordinary database management tool or a like tool. The datacenter operating company 1100 manages data, manages the cloud server 1110, and operates a datacenter which performs these services. The details of the services to be provided by the datacenter operating company 1100 will be described later.

The datacenter operating company 1100 is not limited to a company which manages data or operates the cloud server 1110. For instance, as illustrated in FIG. 1B, in the case where a device manufacturer which develops and manufactures one of the devices 1010 manages data or manages the cloud server 111, the device manufacturer corresponds to the datacenter operating company 1100. Further, the number of datacenter operating companies 1100 is not limited to one. For instance, as illustrated in FIG. 1C, when a device manufacturer and another managing company jointly or sharingly manage data or operates the cloud server 1110, both or one of the device manufacturer and the managing company corresponds to the datacenter operating company 1100.

The service provider 1200 is provided with a server 1210. The scale of the server 1210 does not matter. For instance, the server 1210 includes a memory in a PC for personal use. Further, the service provider 1200 may not be provided with the server 1210.

In the aforementioned services, the home gateway 1020 is not an essential element. For instance, when the cloud server 1110 manages all the data, the home gateway 1020 is not necessary. Further, when all the devices in a home are connected to the Internet, a device incapable of being connected to the Internet by itself may not exist.

Next, a flow of information in the services is described.

The device A or the device B in the group 1000 individually transmits log information thereof to the cloud server 1110 in the datacenter operating company 1100. The cloud server 1110 accumulates the log information of the device A or of the device B (see the arrow 131 in FIG. 1A). The log information is information indicating e.g. operation conditions or operation dates and times of the devices 1010. For instance, the log information includes a viewing history of TV, video recording reservation information in a recorder, a date and time when a washing machine is operated, a quantity of laundry, a date and time when a refrigerator is opened and closed, or the number of times of opening and closing a refrigerator. The log information is not limited to these information, and may include a variety of types of information acquirable from a variety of types of devices. The log information may be directly provided from the devices 1010 themselves to the cloud server 1110 via the Internet. Further, the log information may be temporarily accumulated in the home gateway 1020 from the devices 1010, and may be provided from the home gateway 1020 to the cloud server 1110.

Next, the cloud server 1110 in the datacenter operating company 1100 provides the accumulated log information to the service provider 1200 unit by unit. The unit may be the amount of information, by which the datacenter operating company 1100 can organize and provide the accumulated information to the service provider 1200, or may be the amount of information required from the service provider 1200. In the embodiment, information is provided unit by unit. Alternatively, information may not be provided unit by unit, and the amount of information to be provided may vary depending on a condition. The log information is stored in the server 1210 owned by the service provider 1200, as necessary (see the arrow 132 in FIG. 1A).

The service provider 1200 organizes the log information into information appropriate for the service to be provided to the user, and provides the organized information to the user. The user to whom information is provided may be a user 1 who uses the devices 1010, or may be a user 2 on the outside. The information provision method to the users 1 and 2 may be such that information is directly provided to the users 1 and 2 from the service provider 1200 (see the arrows 133 and 134 in FIG. 1A). Further, the information provision method to the user 1 may be such that information is provided to the user 1 via the cloud server 1110 in the datacenter operating company 1100 (see the arrows 135 and 136 in FIG. 1A). Further, the cloud server 1110 in the datacenter operating company 1100 may organize the log information into information appropriate for the service to be provided to the user, and may provide the organized information to the service provider 1200.

The user 1 may be identical to or different from the user 2.

In the following, the information providing system in the embodiment of the invention is described referring to the drawings.

The embodiment described in the following section is a preferred exemplary embodiment. In other words, the numerical values, the shapes, the materials, the constituent elements, the disposition of the constituent elements, the connecting manners of the constituent elements, the steps, and the order of the steps are merely an example of the invention, and do not limit the gist of the invention. The invention is specified on the basis of the claims as defined herein. Therefore, although the constituent elements that are not described in the independent claims defining the broadest scope of the invention among the constituent elements in the embodiment may not be necessarily required in order to solve the problems of the invention, they are described as the constituent elements constituting a preferred embodiment.

1. Configuration of Information Providing System

In this section, the information providing system in the embodiment of the invention is described referring to the drawings.

1.1 Overall Configuration of Information Providing System 10

Figure 2:
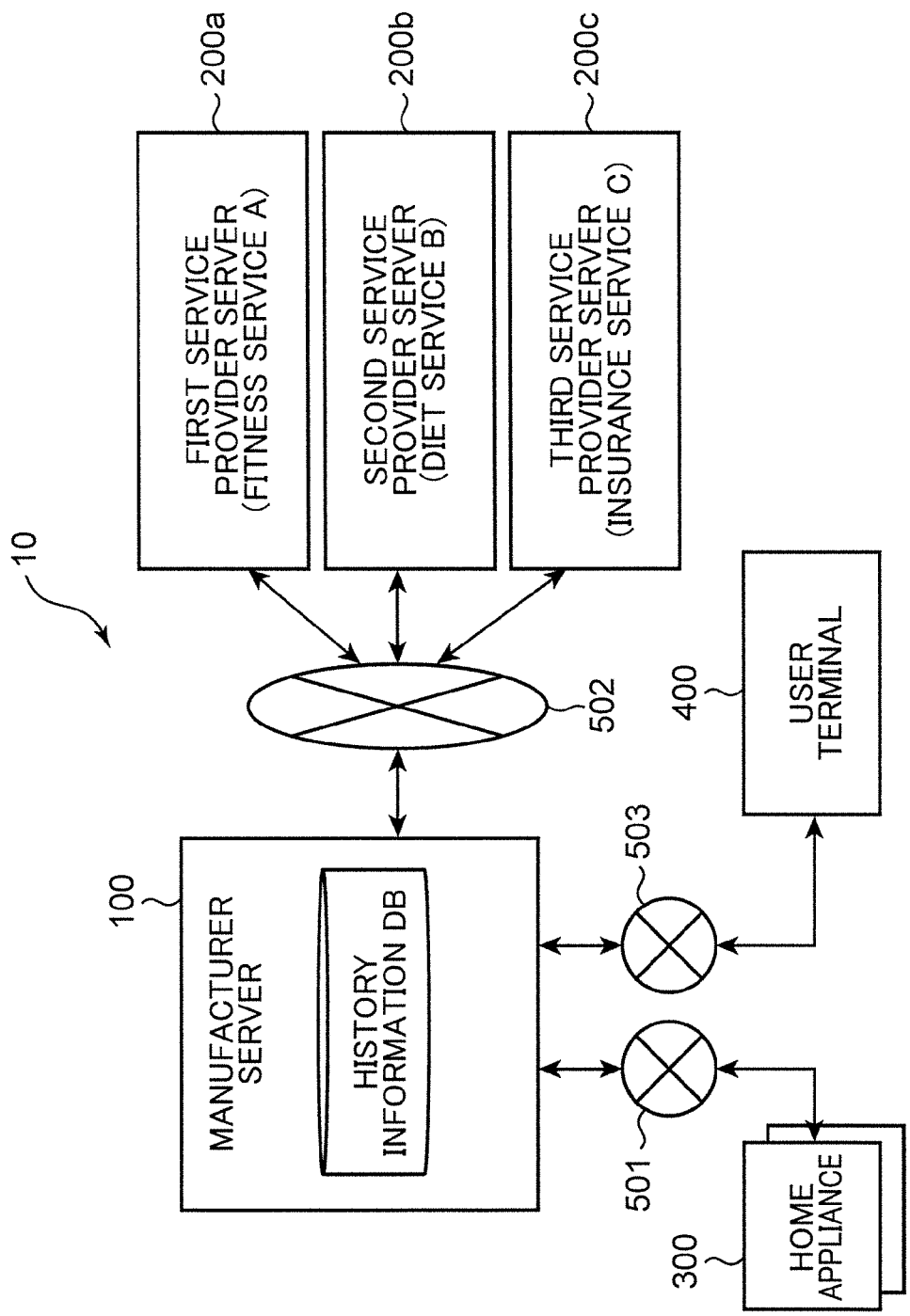
FIG. 2 is a diagram illustrating an overall configuration of an information providing system in the embodiment of the invention.

FIG. 2 is a diagram illustrating the overall configuration of an information providing system 10 in the embodiment of the invention. The information providing system 10 is provided with a manufacturer server 100, a first service provider server 200a, a second service provider server 200b, a third service provider server 200c, home appliances 300, and a user terminal 400.

The home appliances 300 are e.g. a TV receiver, a body composition meter, or an activity meter. The home appliances 300 are home appliances of which home appliance history information is collected by the information providing system 10.

The home appliances 300 may be e.g. an air conditioner, AV equipment such as a TV receiver, a washing machine, an illumination device, an electronic shutter, or an interphone. Further, the home appliances 300 may be any electrical devices to be used in a home including housing equipment, sensors for measuring and detecting the dwelling environment, and electrical vehicles. The home appliances 300 may be any electrical devices as far as the devices are capable of collecting log information.

The user terminal 400 is e.g. a personal computer, a mobile phone, or a mobile terminal such as a tablet terminal or a smartphone.

The manufacturer server 100 is communicatively connected to the home appliances 300 via a first network 501. Further, the manufacturer server 100 is communicatively connected to each of the first service provider server 200a, the second service provider server 200b, and the third service provider server 200c via a second network 502. Further, the manufacturer server 100 is communicatively connected to the user terminal 400 via a third network 503. The first network 501, the second network 502, and the third network 503 may all be the same, or may all be different from each other. Further alternatively, at least two of the first network 501, the second network 502, and the third network 503 may be the same.

The first network 501, the second network 502, and the third network 503 may be constituted by e.g. the Internet, a mobile phone communication network, or an LAN (Local Area Network).

The information providing system 10 collects log information from one or more home appliances 300 of one or more users via the first network 501, and transmits the log information to a computer (the first service provider server 200a, the second service provider server 200b, or the third service provider server 200c) of one or more service providers via the second network 502.

In the embodiment, the first service provider server 200a, the second service provider server 200b, and the third service provider server 200c may also be generically called as a service provider server 200.

1.2 Configuration of Manufacturer Server 100

Figure 3:
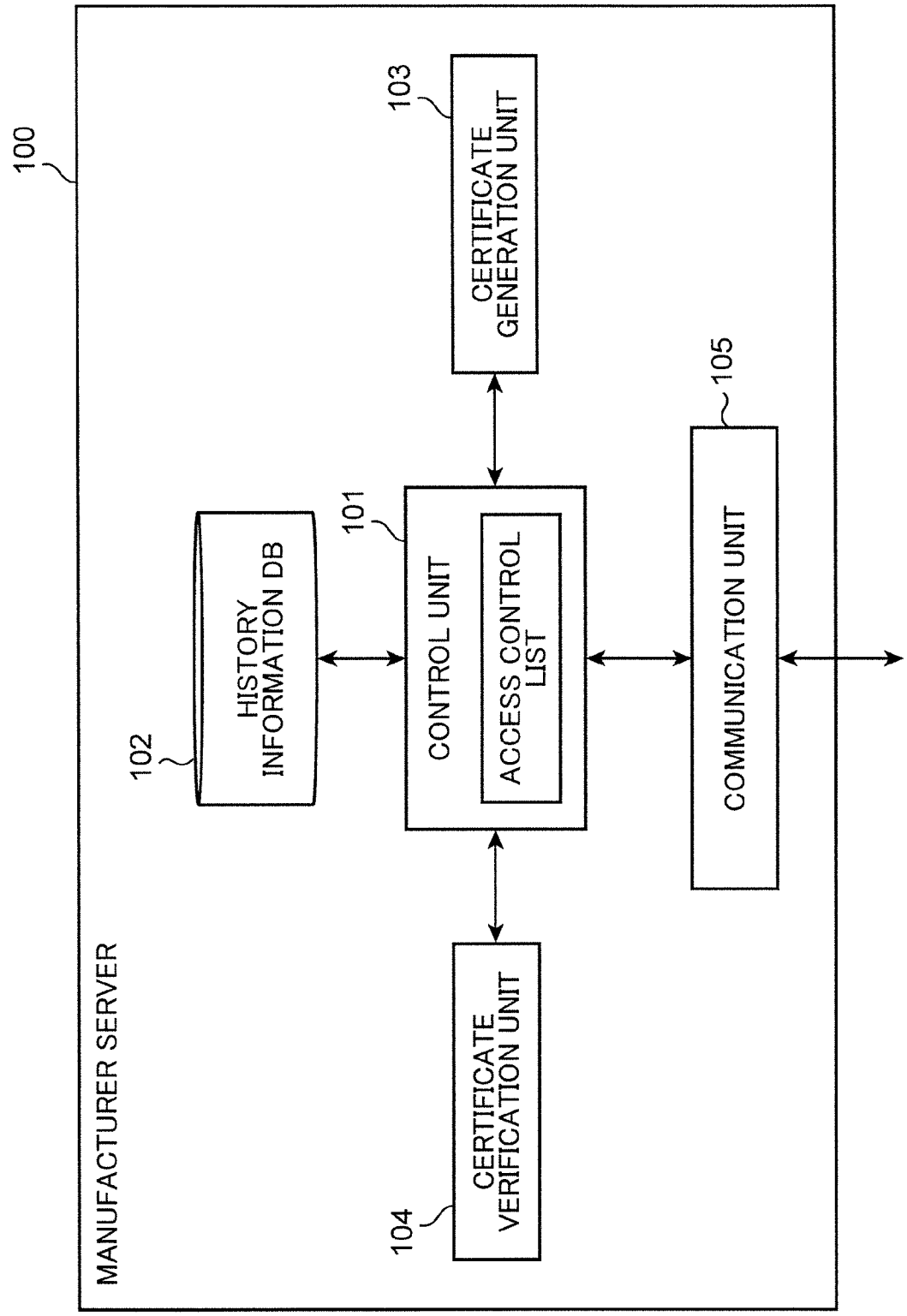
FIG. 3 is a diagram illustrating a configuration of a manufacturer server in the embodiment of the invention.

FIG. 3 is a diagram illustrating a configuration of the manufacturer server 100 in the embodiment of the invention. The manufacturer server 100 is provided with a control unit 101, a history information DB (database) 102, a certificate generation unit 103, a certificate verification unit 104, and a communication unit 105.

The control unit 101 controls the history information DB 102 with use of an access control list, and manages user information or home appliance history information. The access control list will be described later. In response to receiving a request to provide home appliance history information from a service provider server, the control unit 101 transmits, to the certificate verification unit 104, a request to verify a public key certificate (not illustrated) of a service provider received from the service provider server. In response to receiving a notification that verification was successful from the certificate verification unit 104, the control unit 101 judges whether home appliance history information is to be provided to the service provider server. When it is judged that home appliance history information is to be provided, the control unit 101 judges which one of the home appliance history information is to be provided to the service provider server. The control unit 101 requests the certificate generation unit 103 to issue a home appliance history access certificate. In response to receiving the home appliance history access certificate issued by the certificate generation unit 103, the control unit 101 transmits the home appliance history access certificate to the service provider server via the communication unit 105. An information provision method for providing home appliance history information from the history information DB 102 with use of an access control list will be described later.

The history information DB 102 stores user IDs for identifying the users and home appliance history information.

The home appliance history information is information indicating an operation history of home appliances 300 by the user (e.g. a history of operating the TV channels), and a user information history to be measured or detected by use of the home appliances 300 by the user (e.g. a history of the user's body weight to be measured with use of a body composition meter by the user).

FIG. 4 is a diagram illustrating an example of data to be stored in the history information DB in the embodiment of the invention. The history information DB 102 stores home appliance types indicating the types of home appliances 300 owned by the user to be identified by the user ID, and home appliance history information of the home appliances 300 represented by the home appliance types in association with each other, with respect to each of the user IDs. In the embodiment, the home appliance types are the names of the home appliances. Alternatively, the home appliance types may be serial numbers or model numbers of the home appliances, or may be combinations of serial numbers and model numbers.

FIG. 4 illustrates that the user whose user ID is "ID11" registers a body composition meter and a TV receiver as home appliances in the information providing system 10, and that home appliance history information of each of the home appliances is stored in the history information DB 102. Further, the history information DB 102 stores, as home appliance history information of the body composition meter, information describing "2012.1.1, BODY WEIGHT: 55 KG, BODY FAT PERCENTAGE: 18%", and "2012.1.3, BODY WEIGHT: 56 KG, BODY FAT PERCENTAGE: 19%". This means that when the user measured her body composition on Jan. 1, 2012, the body weight was 55 kg, and the body fat percentage was 18%; and when the user measured her body composition on Jan. 3, 2012, the body weight was 56 kg, and the body fat percentage was 19%. Likewise, the history information DB 102 stores, as home appliance history information of the TV receiver, a viewing history of TV programs which the user watched on TV i.e. "2012.1.1, 18:00 DRAMA, 20:00 NEWS" and "2012.1.3, 10:00 ANIMATION, 13:00 DRAMA".

Further, the user whose user ID is "ID12" registers a body composition meter as a home appliance in the information providing system 10. The history information DB 102 stores home appliance history information "2011.12.30, BODY WEIGHT: 80 KG, BODY FAT PERCENTAGE: 22%" and "2012.1.3, BODY WEIGHT: 82 KG, BODY FAT PERCENTAGE: 22%".

These home appliance history information is information to be periodically or non-periodically uploaded from the home appliances that are registered in advance in the information providing system 10 by the users to the manufacturer server 100. The home appliance history information is an example of log information.

In response to receiving a request to issue a home appliance history access certificate from the control unit 101, the certificate generation unit 103 generates a home appliance history access certificate.

Figures 5, 6:
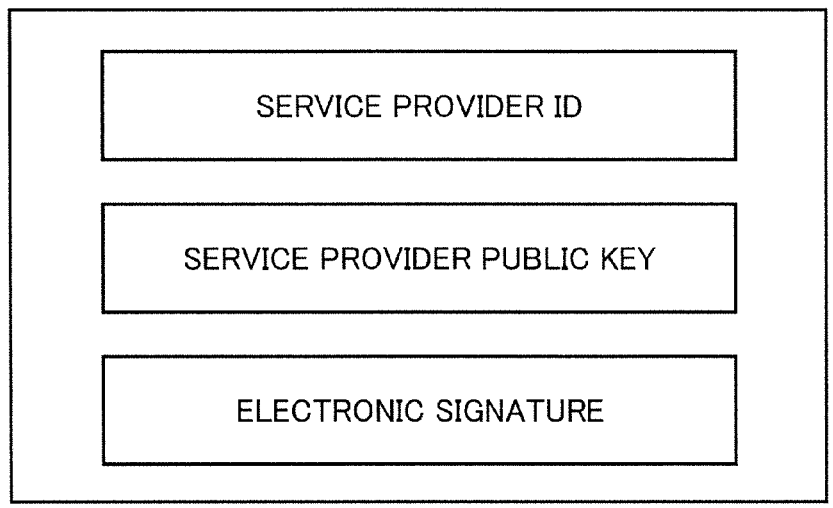
FIG. 5 is a diagram illustrating an example of a home appliance history access certificate in the embodiment of the invention.
FIG. 6 is a diagram illustrating an example of an access control list in the embodiment of the invention.

FIG. 5 is a diagram illustrating an example of a home appliance history access certificate in the embodiment of the invention. The home appliance history access certificate is a certificate such that a home appliance manufacturer electronically signs with use of a signature generation key (not illustrated) of the home appliance manufacturer with respect to a service provider ID and with respect to a service provider public key. The service provider ID is an identifier for identifying the service provider server. The service provider public key is a public key to be issued by the service provider server. The service provider server can acquire home appliance history information accessible by the service provider server by presenting the home appliance history access certificate to the manufacturer server. Further, the certificate generation unit 103 may include the type of a home appliance to be provided to the service provider server or information to be provided in the home appliance history access certificate.

In response to receiving a public key certificate issued by the service provider server from the control unit 101, the certificate verification unit 104 verifies the received public key certificate. Further, in response to receiving a home appliance history access certificate issued by the service provider server from the control unit 101, the certificate verification unit 104 verifies the received home appliance history access certificate with use of a signature verification key (not illustrated) of the home appliance manufacturer. The certificate verification unit 104 notifies the verification result to the control unit 101.

The communication unit 105 communicates with the service provider server, the home appliances 300, and the user terminal 400. Communication between the service provider server and the user terminal 400 is carried out by SSL (Secure Socket Layer) communication. The communication unit 105 stores certificates necessary for SSL communication.

1.2.1 Method for Providing Home Appliance History with use of Access Control List FIG. 6 is a diagram illustrating an example of the access control list in the embodiment of the invention. The access control list indicates user information providing acceptance/non-acceptance such that from which one of the home appliances, home appliance history information is acquired, and of which one of the user IDs, providing home appliance history information is permitted for each of the home appliances with respect to each of the service provider IDs. In the access control list, the service provider ID for identifying the service provider, the type of a home appliance of which home appliance history information is providable to the service provider, and the user ID of the user who does not provide home appliance history information to the service provider are associated with each other. In FIG. 6, regarding the fitness service A whose service provider ID is "SID_a", it is possible to acquire home appliance history information from the body composition meter, the TV receiver, and the blood pressure meter, and there is no user who sets such that home appliance history information of the body composition meter is not provided. In FIG. 6, none of the users sets whether home appliance history information of the body composition meter is provided to the service provider A.

For instance, when the user whose user ID is "ID11" does not provide home appliance history information of the body composition meter to the fitness service A, the user ID "ID11" is recorded in the column of un-providable user ID in the access control list. This means that home appliance history information of the body composition meter of the user whose user ID is "ID11" is not provided.

The control unit 101 accumulates, in the access control list (first database), the service provider ID (first identifier) identifying each of one or more service providers, and a home appliance type (first device information) indicating a home appliance to be designated by each of the one or more service providers in association with each other.

The control unit 101 accumulates, in the history information DB 102 (second database), the user ID (second identifier) identifying each of one or more users, and a home appliance type (second device information) indicating a home appliance to be used by the one or more users in association with each other.

When the second device information is updated by addition of a new home appliance to be used by one of the one or more users, and the new home appliance is included in the home appliances indicated by the first device information, the control unit 101 extracts a service provider associated with the first device information. Then, the control unit 101 provides, to the user terminal 400 (display terminal) of the one user, first screen information indicating a setting screen, on which the user is allowed to set whether log information of the new home appliance is to be transmitted to the computer of the extracted service provider.

Further, the control unit 101 judges whether the same electrical device as the new electrical device included in the updated second device information is included in the electrical devices indicated by the first device information. When it is judged that the same electrical device as the new electrical device is included in the electrical devices indicated by the first device information, the control unit 101 extracts a service provider associated with the first device information.

Further, when the first database is updated by addition of a new service provider, and a home appliance to be designated by the new service provider is included in the home appliances indicated by the second device information, the control unit 101 extracts a user associated with the second device information from the one or more users. Then, the control unit 101 provides, to the user terminal 400 (display terminal) of the associated user, second screen information indicating a setting screen, on which the user is allowed to set whether log information of the home appliance to be designated by the new service provider is transmitted to the computer of the new service provider.

1.3 Configuration of Service Provider Server 200*a*

Figure 7:
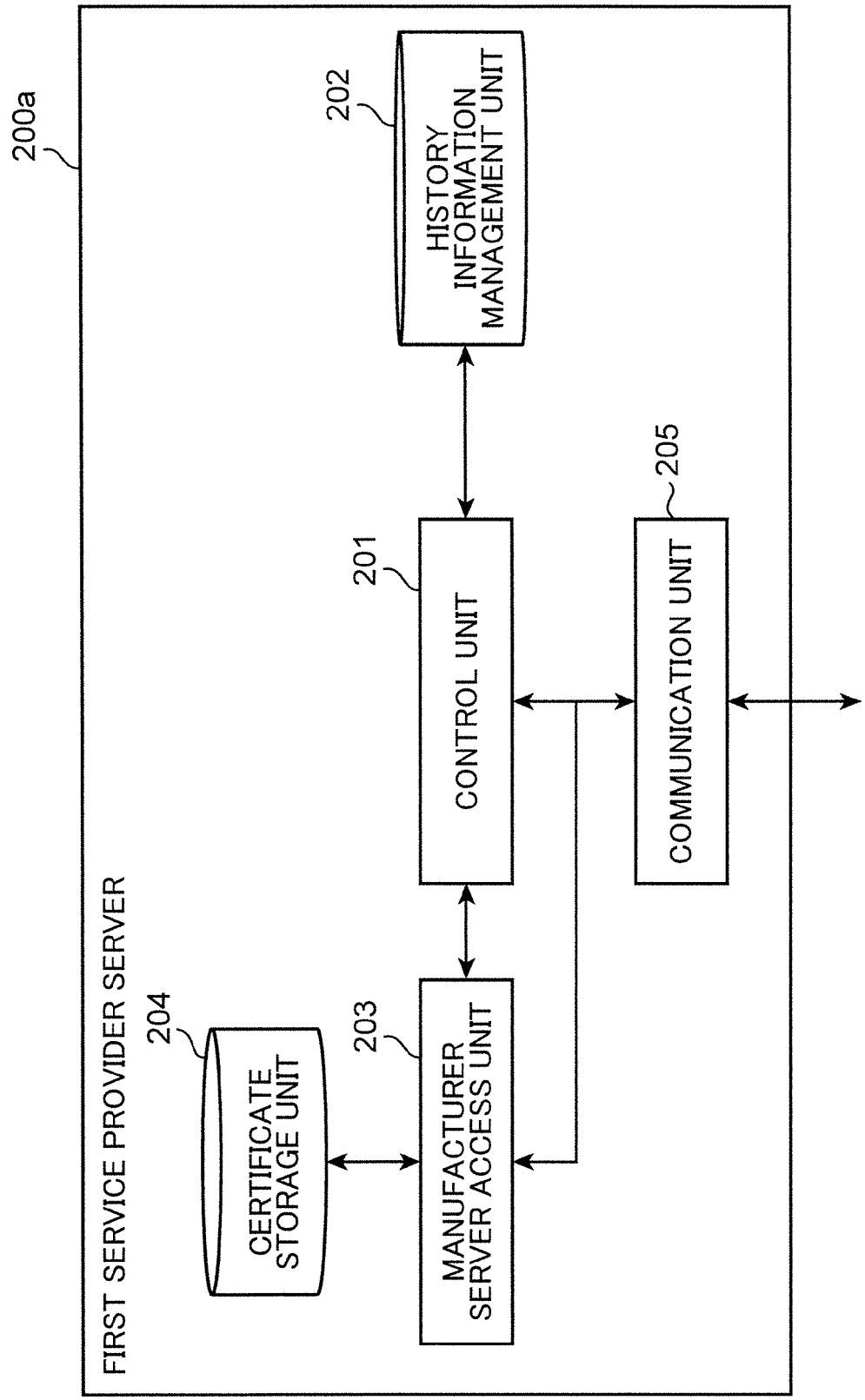
FIG. 7 is a diagram illustrating a configuration of a first service provider server in the embodiment of the invention.

FIG. 7 is a diagram illustrating a configuration of the first service provider server 200*a* in the embodiment of the invention. The configurations of the second service provider server 200*b* and the third service provider server 200*c* are the same as the configuration of the first service provider server 200*a*. Therefore, in this section, only the configuration of the first service provider server 200*a* is described. The first service provider server 200*a* is provided with a control unit 201, a history information management unit 202, a manufacturer server access unit 203, a certificate storage unit 204, and a communication unit 205.

The control unit 201 controls the history information management unit 202, and manages home appliance history information acquired from the manufacturer server 100.

The history information management unit 202 stores the home appliance history information acquired from the manufacturer server 100.

The manufacturer server access unit 203 accesses to the manufacturer server 100 via the communication unit 205. The manufacturer server access unit 203 accesses to the manufacturer server 100, and submits a home appliance history acquisition request to acquire home appliance history information. When providing home appliance history information is permitted in response to the home appliance history acquisition request, the manufacturer server access unit 203 receives a home appliance history access certificate from the manufacturer server 100, and manages the received home appliance history access certificate by the certificate storage unit 204.

The certificate storage unit 204 stores the home appliance history access certificate issued from the manufacturer server 100. The communication unit 205 communicates with the manufacturer server 100.

1.4 Configuration of User Terminal 400

Figure 8:
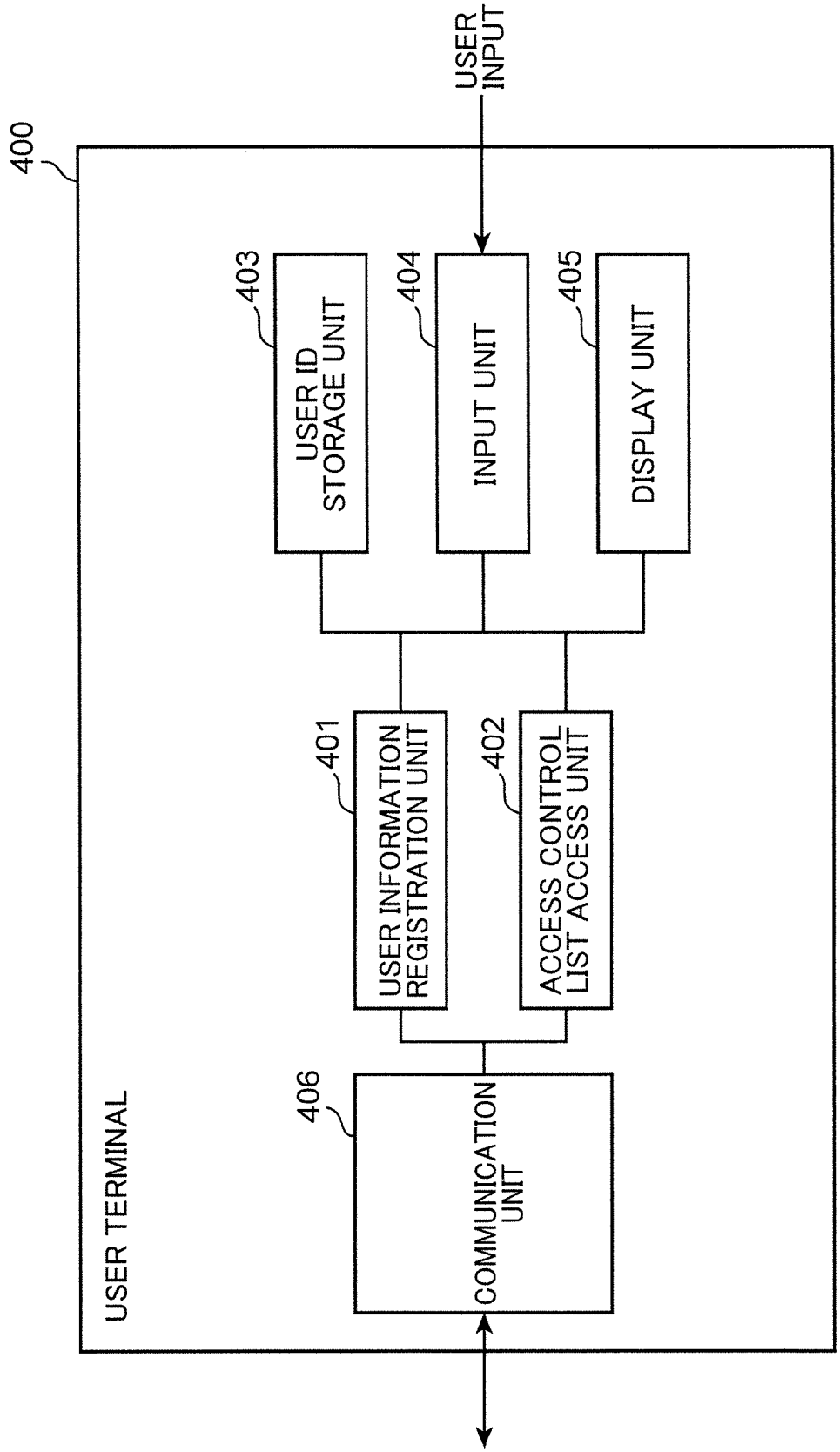
FIG. 8 is a diagram illustrating a configuration of a user terminal in the embodiment of the invention.

FIG. 8 is a diagram illustrating a configuration of the user terminal 400 in the embodiment of the invention. The user terminal 400 is provided with a user information registration unit 401, an access control list access unit 402, a user ID storage unit 403, an input unit 404, a display unit 405, and a communication unit 406.

The user information registration unit 401 controls a user information registration process of registering user information and a home appliance registration process of registering a home appliance, which are carried out with respect to the manufacturer server 100. The user information registration unit 401 transmits a user ID and a password to the manufacturer server 100 when the user terminal 400 accesses to the manufacturer server 100.

The access control list access unit 402 accesses to the manufacturer server 100, and requests the manufacturer server 100 to register or update whether home appliance history information is to be provided with respect to the access control list.

The user ID storage unit 403 stores the user ID. The input unit 404 accepts input from the user. The display unit 405 displays a screen to be presented to the user. The communication unit 406 performs communication with the manufacturer server 100. SSL communication is used as communication between the user terminal 400 and the manufacturer server 100. The communication unit 406 stores a certificate necessary for SSL communication.

1.5 Operations of Information Providing System 10

Figure 9:
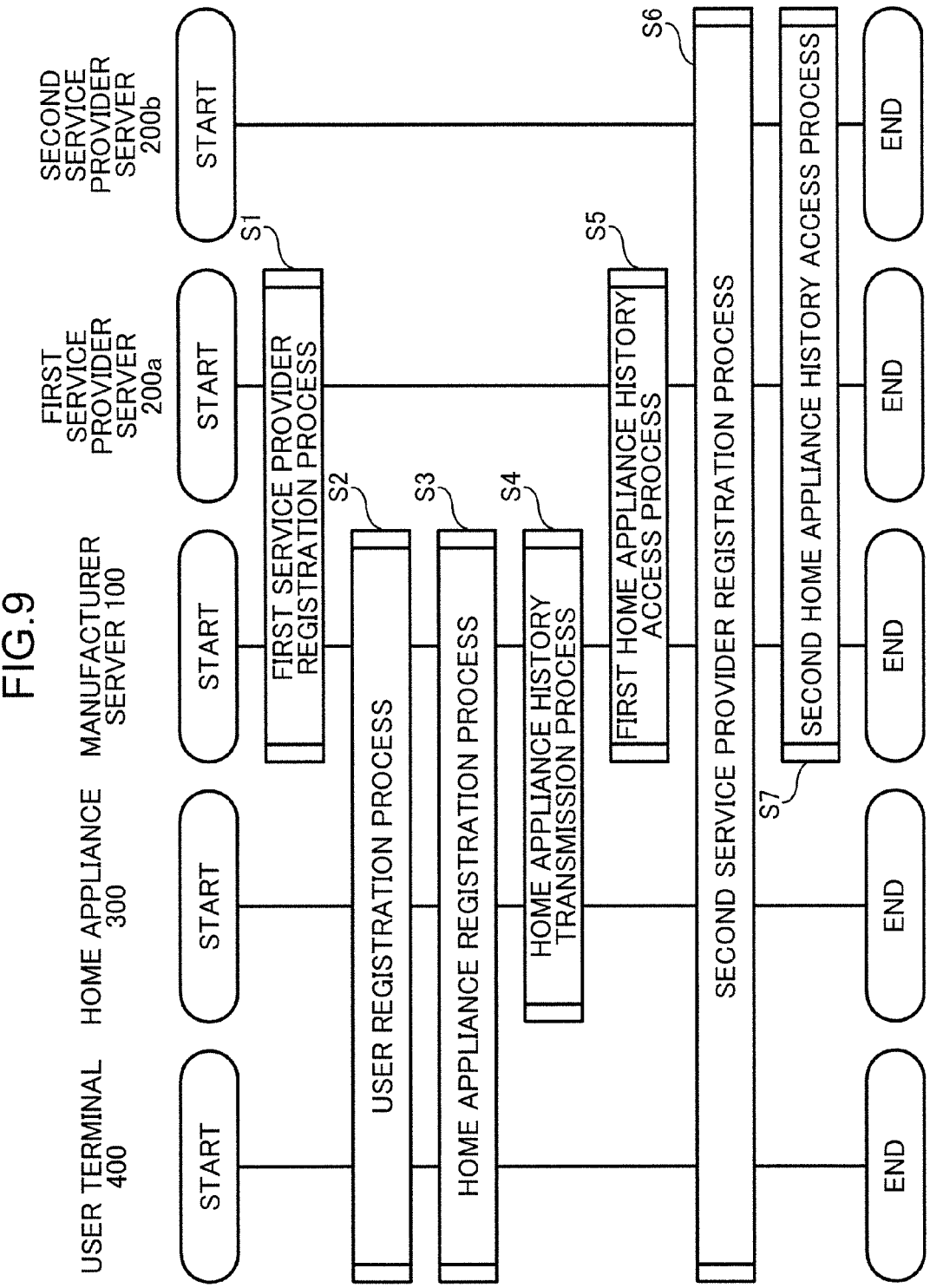
FIG. 9 is a sequence diagram illustrating a flow of the overall process to be carried out by the information providing system.

FIG. 9 is a sequence diagram illustrating a flow of the overall process to be carried out by the information providing system. The operations of the information providing system 10 include (1) a first service provider registration process S1 of registering access permission from the service provider server 200 to the manufacturer server 100 with respect to the history information DB before the user registers a home appliance 300; a user registration process S2 of registering user information in the manufacturer server 100 with use of the user terminal 400 by the user; (3) a home appliance registration process S3 of registering the home appliance 300 in the manufacturer server 100 through the user terminal 400; (4) a home appliance history transmission process S4 of uploading home appliance history information from the user's home appliance 300 to the history information DB in the manufacturer server 100; (5) a first home appliance history access process S5 of acquiring home appliance history information to be managed in the manufacturer server 100 by the service provider server 200; (6) a second service provider registration process S6 of newly registering access permission from a new service provider server 200 to the manufacturer server 100 with respect to the history information DB after the user registers the home appliance 300; and (7) a second home appliance history access process S7 of acquiring home appliance history information to be managed in the manufacturer server 100 by the newly registered service provider server 200.

The second home appliance history access process S7 is the same as the first home appliance history access process S5, and therefore, description about the second home appliance history process S7 is omitted herein.

In the following, each of the operations to be performed by the information providing system is described using the drawings.

1.5.1 Operation of First Service Provider Registration Process

Figure 10:
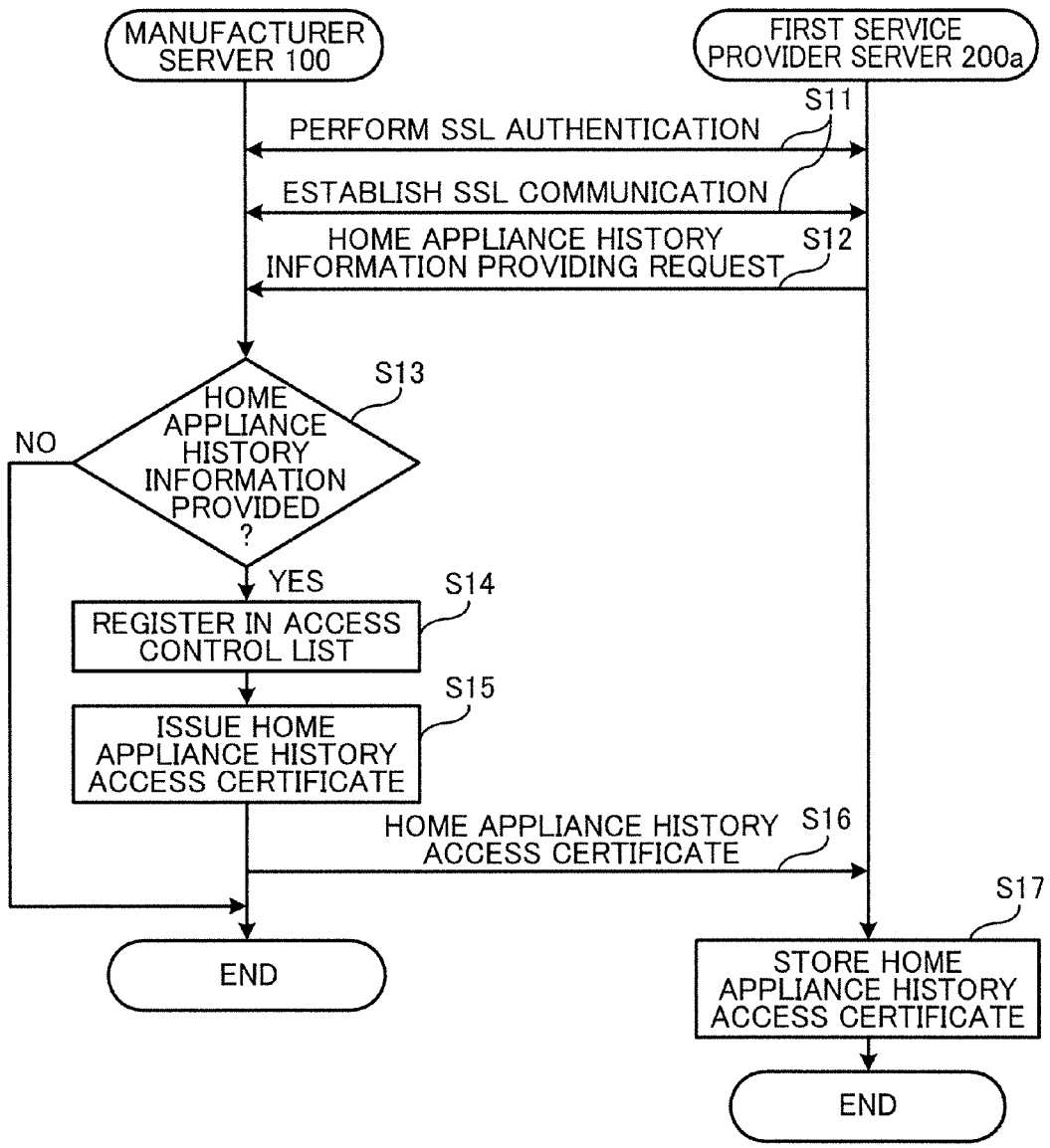
FIG. 10 is a sequence diagram illustrating an operation of a first service provider registration process in the embodiment of the invention.

FIG. 10 is a sequence diagram illustrating an operation of the first service provider registration process in the embodiment of the invention.

First of all, the communication unit 205 of the first service provider server 200a performs SSL authentication with respect to the manufacturer server 100, establishes SSL communication, and establishes an encrypted communication path (Step S11).

Subsequently, the manufacturer server access unit 203 of the first service provider server 200a transmits, to the manufacturer server 100, a home appliance history information providing request requesting the manufacturer server 100 to provide intended home appliance history information together with a public key certificate of the first service provider server 200a (Step S12). The communication unit 105 of the manufacturer server 100 receives the home appliance history information providing request transmitted by the first service provider server 200a.

The manufacturer server access unit 203 stores in advance a service provider ID for identifying the first service provider, the type of a home appliance of which home appliance history information is acquired, and home appliance history information to be acquired by the first service provider server 200a. The manufacturer server access unit 203 transmits a home appliance history information providing request including the service provider ID, the type of a home appliance, and the home appliance history information to be acquired. Further, the manufacturer server access unit 203 stores in advance the public key certificate of the first service provider server 200a.

Subsequently, the certificate verification unit 104 of the manufacturer server 100 verifies the public key certificate of the first service provider server 200a, and the control unit 101 judges whether the home appliance history information requested by the first service provider is provided (Step S13). When it is judged that the home appliance history information is not provided (NO in Step S13), the process is terminated.

On the other hand, when it is judged that the home appliance history information is provided (YES in Step S13), the control unit 101 of the manufacturer server 100 registers, in the access control list, the service provider ID of the first service provider A and the type of the home appliance of which home appliance history information is provided (Step S14). For instance, in FIG. 6, the control unit 101 registers, in the access control list, "SID_a", which is the service provider ID of the first service provider A, and the type of the home appliance of which home appliance history information is provided.

Subsequently, the certificate generation unit 103 issues a home appliance history access certificate to the first service provider server 200a in which the service provider ID and the home appliance type are registered (Step S15).

Subsequently, the communication unit 105 of the manufacturer server 100 transmits the home appliance history access certificate generated by the certificate generation unit 103 to the first service provider server 200a (Step S16). The communication unit 205 of the first service provider server 200a receives the home appliance history access certificate transmitted by the manufacturer server 100.

Subsequently, the manufacturer server access unit 203 of the first service provider server 200a stores the received home appliance history access certificate in the certificate storage unit 204 (Step S17).

1.5.2 Operation of User Registration Process

Figure 11:
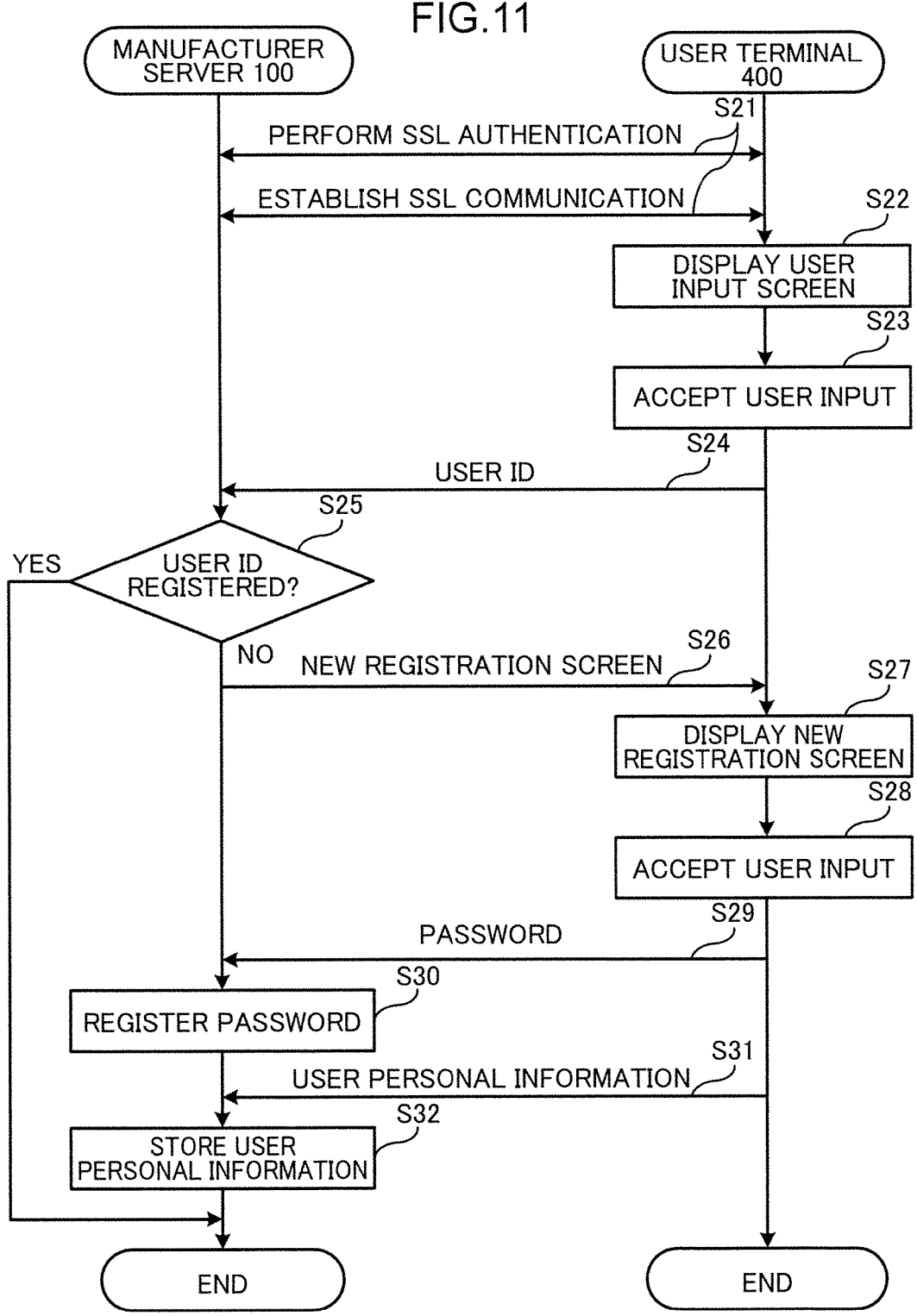
FIG. 11 is a sequence diagram illustrating an operation of a user registration process in the embodiment of the invention.

FIG. 11 is a sequence diagram illustrating an operation of the user registration process in the embodiment of the invention.

First of all, the communication unit 406 of the user terminal 400 performs SSL authentication with respect to the manufacturer server 100, establishes SSL communication, and establishes an encrypted communication path (Step S21). In this section, SSL authentication and an encrypted communication path are not described in details.

Subsequently, the display unit 405 of the user terminal 400 displays a user input screen on which user's input of the user ID is accepted (Step S22).

Subsequently, the input unit 404 accepts the user's input of the user ID (Step S23).

Subsequently, the communication unit 406 transmits the user ID input through the input unit 404 to the manufacturer server 100 (Step S24). The communication unit 105 of the manufacturer server 100 receives the user ID transmitted by the user terminal 400.

Subsequently, the control unit 101 of the manufacturer server 100 judges whether the received user ID is already registered (Step S25). The control unit 101 stores in advance in a user information DB (not illustrated), a user ID, a password, and user personal information such as the name, the address, and the electronic mail address of the user, as user information. The control unit 101 judges whether the received user ID is already registered, referring to the user information DB. When it is judged that the user ID is already registered (YES in Step S25), the control unit 101 notifies the user terminal 400 that the user ID is already registered, and the process is terminated.

On the other hand, when it is judged that the user ID is not registered (NO in Step S25), the control unit 101 transmits, to the user terminal 400, a new registration screen for use in newly registering user information (Step S26). The communication unit 406 of the user terminal 400 receives the new registration screen transmitted by the manufacturer server 100.

Subsequently, the display unit 405 of the user terminal 400 displays the new registration screen for use in allowing the user to newly register user information (Step S27).

Subsequently, the input unit 404 accepts user's input of the password and the user personal information (Step S28). The user inputs the password and the user personal information in accordance with a predetermined format via the user terminal 400.

Subsequently, the communication unit 406 transmits the password input through the input unit 404 to the manufacturer server 100 (Step S29). The communication unit 105 of the manufacturer server 100 receives the password transmitted by the user terminal 400.

Subsequently, the control unit 101 of the manufacturer server 100 registers the received password in the user information DB in association with the user ID (Step S30).

Subsequently, the communication unit 406 of the user terminal 400 transmits the user personal information input through the input unit 404 to the manufacturer server 100 (Step S31). The communication unit 105 of the manufacturer server 100 receives the user personal information transmitted by the user terminal 400.

Subsequently, the control unit 101 of the manufacturer server 100 stores the received user personal information in the user information DB in association with the user ID (Step S32). The user ID, the password, and the user personal information are stored in the manufacturer server 100 as user information.

1.5.3 Operation of Home Appliance Registration Process

Figure 12:
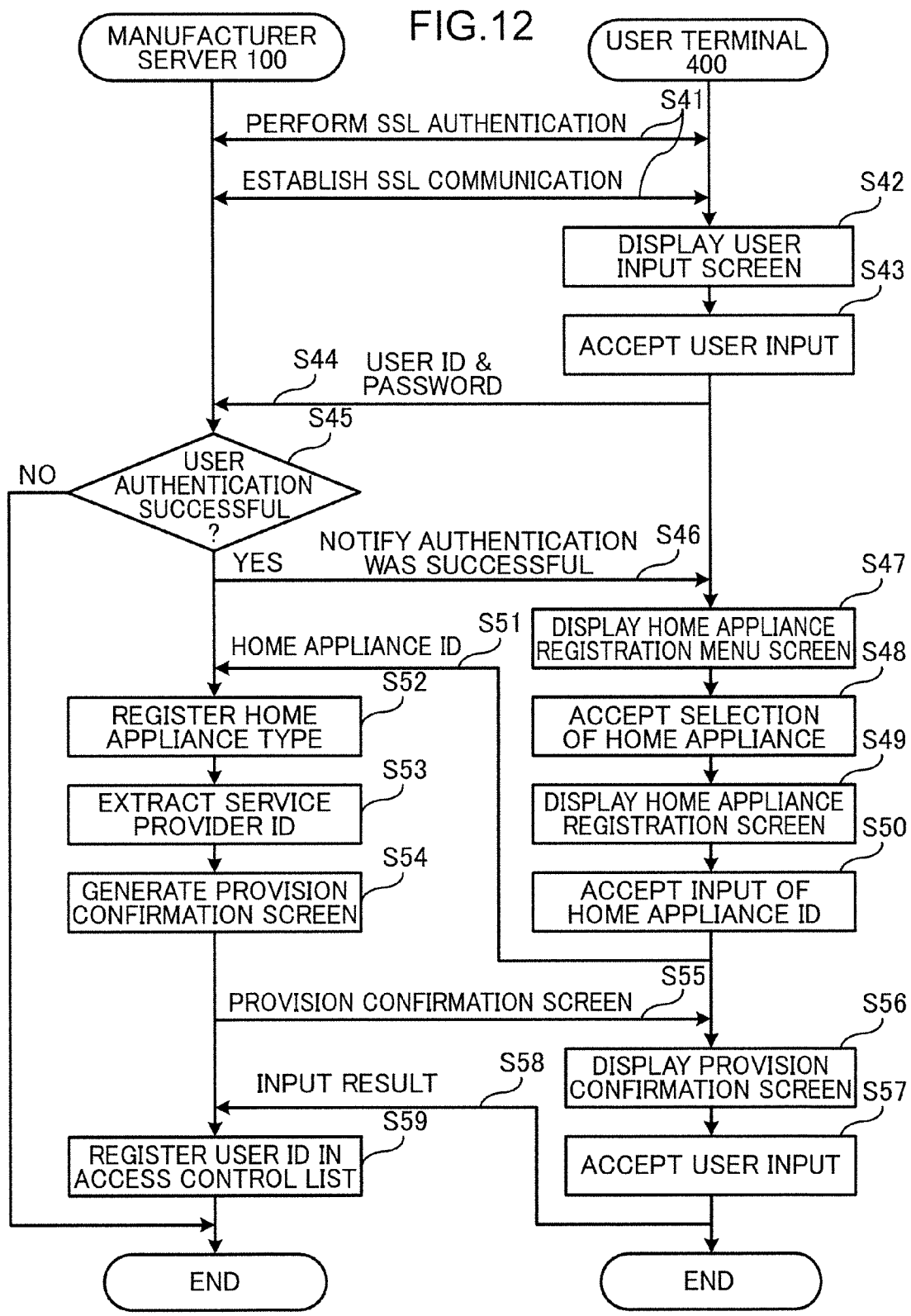
FIG. 12 is a sequence diagram illustrating an operation of a home appliance registration process in the embodiment of the invention.

FIG. 12 is a sequence diagram illustrating an operation of the home appliance registration process in the embodiment of the invention.

First of all, the communication unit 406 of the user terminal 400 performs SSL authentication with respect to the manufacturer server 100, establishes SSL communication, and establishes an encrypted communication path (Step S41).

Subsequently, the display unit 405 of the user terminal 400 displays a user input screen for use in accepting user's input of the user ID and the password (Step S42).

Subsequently, the input unit 404 accepts the user's input of the user ID and the password (Step S43). The user inputs the user ID and the password registered in the user registration process.

Subsequently, the communication unit 406 transmits the user ID and the password input through the input unit 404 to the manufacturer server 100 (Step S44). The communication unit 105 of the manufacturer server 100 receives the user ID and the password transmitted by the user terminal 400.

Subsequently, the control unit 101 of the manufacturer server 100 performs user authentication with use of the received user ID and the received password, and judges whether user authentication was successful (Step S45). The control unit 101 reads out the password associated with the received user ID from the user information DB, and compares between the readout password and the received password. When the passwords match each other, the control unit 101 judges that user authentication was successful, and when the passwords do not match each other, the control unit 101 judges that user authentication has failed. When it is judged that user authentication has failed (NO in Step S45), the control unit 101 notifies the user terminal 400 that user authentication has failed, and the process is terminated.

On the other hand, when it is judged that user authentication was successful (YES in Step S45), the communication unit 105 notifies the user terminal 400 that user authentication was successful (Step S46). The communication unit 406 of the user terminal 400 receives a notification that user authentication transmitted by the manufacturer server 100 was successful.

Subsequently, the display unit 405 of the user terminal 400 displays a home appliance registration menu screen for use in allowing the user to newly register a home appliance (Step S47).

Subsequently, the input unit 404 accepts user's selection of a home appliance on the home appliance registration menu screen (Step S48).

Subsequently, the display unit 405 displays the home appliance registration screen for use in allowing the user to input a home appliance ID (Step S49).

Subsequently, the input unit 404 accepts user's input of a home appliance ID on the home appliance registration screen (Step S50). The user is allowed to input a home appliance ID to be registered to the user terminal 400 on the home appliance registration screen.

Subsequently, the communication unit 406 transmits the home appliance ID input through the input unit 404 to the manufacturer server 100 (Step S51). The communication unit 406 transmits the user ID together with the home appliance ID. The communication unit 105 of the manufacturer server 100 receives the home appliance ID transmitted by the user terminal 400.

FIG. 13 is a diagram illustrating an example of a home appliance registration screen to be displayed when the home appliance registration process is performed in the embodiment of the invention. The home appliance ID is an ID for identifying the home appliance. The home appliance ID may be printed on a housing of a home appliance or on a printed matter to be enclosed together with a home appliance. In this case, the user inputs the printed home appliance ID with use of the input unit 404. Further, the user terminal 400 may acquire the home appliance ID from the home appliance 300. For instance, the user terminal 400 may communicate with the home appliance 300, acquire the home appliance ID from the home appliance 300, and transmit the acquired home appliance ID to the manufacturer server 100.

Subsequently, the control unit 101 of the manufacturer server 100 specifies the home appliance type from the home appliance ID received from the user terminal 400, and registers the specified home appliance type in the history information DB 102 in association with the user ID (Step S52). In the history information DB 102 illustrated in FIG. 4, the user whose user ID is "ID13" registers a body composition meter as the home appliance in the information providing system 10. The control unit 101 stores in advance a table in which home appliance IDs and home appliance types are associated with each other. The control unit 101 specifies the home appliance type from the home appliance ID by referring to the table.

Subsequently, the control unit 101 of the manufacturer server 100 extracts a service provider ID associated with the newly registered home appliance type from the access control list (Step S53).

Subsequently, the control unit 101 generates a provision confirmation screen for use in asking the user whether home appliance history information is to be provided to the service provider server which is associated with the extracted service provider ID (Step S54).

Subsequently, the communication unit 105 transmits the provision confirmation screen generated by the control unit 101 to the user terminal 400 (Step S55). The communication unit 406 of the user terminal 400 receives the provision confirmation screen transmitted by the manufacturer server 100.

Subsequently, the display unit 405 of the user terminal 400 displays the received provision confirmation screen (Step S56).

Subsequently, the input unit 404 accepts user's input as to whether home appliance history information is provided to the service provider server (Step S57).

Subsequently, the communication unit 406 transmits, to the manufacturer server 100, an input result indicating whether the home appliance history information input through the input unit 404 is provided to the service provider server (Step S58). The communication unit 105 of the manufacturer server 100 receives the input result transmitted by the user terminal 400.

FIG. 14 is a diagram illustrating an example of a provision confirmation screen for use in asking the user whether home appliance history information of the registered home appliance 300 is to be provided to the service provider server. Setting as to whether home appliance history information is provided to the service provider server is described using the example of FIG. 14.

The control unit 101 of the manufacturer server 100 retrieves a service provider ID by which home appliance history information of a body composition meter registered in the access control list is provided when the body composition meter is registered by the user terminal 400. In the example of FIG. 6, the service provider which provides home appliance history information of a body composition meter is the service provider (fitness service A) whose service provider ID is "SID_a", and the service provider (diet service B) whose service provider ID is "SID_b".

As illustrated in FIG. 14, the control unit 101 of the manufacturer server 100 generates a provision confirmation screen including a service provider associated with an extracted service provider ID, a home appliance registered by the user, home appliance history information to be provided from the registered home appliance to the service provider, and checkboxes with which the user is allowed to select whether home appliance history information is to be provided. The control unit 101 displays the generated provision confirmation screen on the user terminal 400. The user is allowed to select whether home appliance history information is to be provided with respect to each of the service providers, and to input the selection result through the input unit 404. The input result is transmitted from the user terminal 400 to the manufacturer server 100.

Subsequently, the control unit 101 of the manufacturer server 100 registers the user ID of the user who does not provide home appliance history information in the access control list on the basis of an input result as to whether home appliance history information selected by the user is provided to the service provider (Step S59). When the home appliance history information is not provided to the service provider, the control unit 101 registers the user ID in the access control list. On the other hand, when the home appliance history information is provided to the service provider, the control unit 101 does not register the user ID in the access control list. As described above, the control unit 101 can discriminate whether user's home appliance history information is to be provided by managing the user ID of the user who does not provide home appliance history information by the access control list.

FIG. 15 is a diagram illustrating an example of an access control list, which is set such that home appliance history information of a body composition meter is not provided by the user. In Step S57, when the user whose user ID is "ID13" does not provide home appliance history information of a body composition meter to the fitness service A, and provides the home appliance history information of the body composition meter to the diet service B, the access control list is set such that "ID13" is registered as the unprovidable user ID associated with the body composition meter identified by "SID_a", and that "ID13" is not registered as the unprovidable user ID associated with the body composition meter identified by "SID_b".

In the embodiment, the access control list is configured such that the user ID of the user who does not provide home appliance history information is stored in association with the home appliance type. The invention is not specifically limited to the above. The user ID of the user who provides home appliance history information may be stored in association with the home appliance type.

1.5.4 Operation of Home Appliance History Transmission Process

Figure 16:
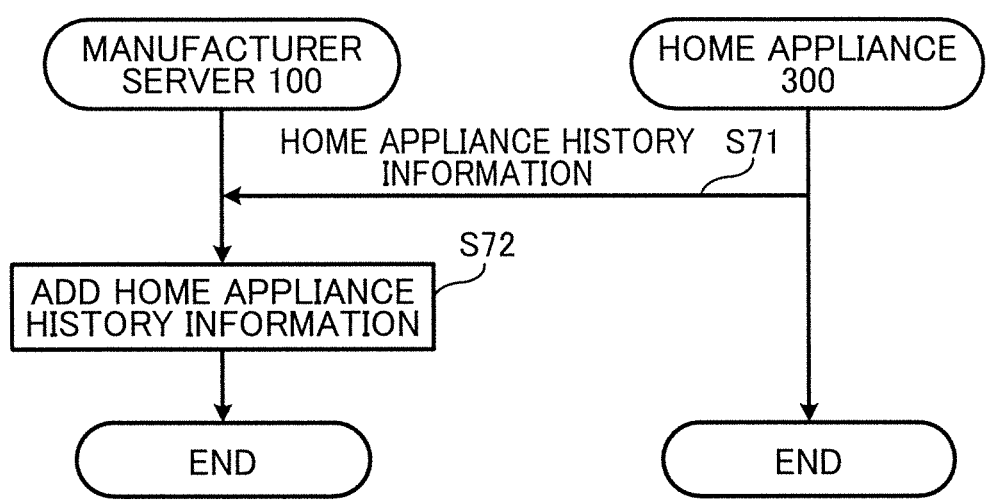
FIG. 16 is a sequence diagram illustrating an operation of a home appliance transmission process in the embodiment of the invention.

FIG. 16 is a sequence diagram illustrating an operation of the home appliance history transmission process in the embodiment of the invention. Home appliance history information is periodically or non-periodically uploaded from a home appliance 300 to the manufacturer server 100.

First of all, the home appliance 300 uploads accumulated home appliance history information to the manufacturer server 100 together with the home appliance ID (Step S71). The communication unit 105 of the manufacturer server 100 receives the home appliance history information and the home appliance ID transmitted by the home appliance 300.

Subsequently, the control unit 101 of the manufacturer server 100 specifies the user ID and the home appliance type associated with the received home appliance ID, retrieves the same user ID and the same home appliance type as the specified user ID and the specified home appliance type from the history information DB 102, and adds the received home appliance history information to the home appliance history information associated with the retrieved user ID and the retrieved home appliance type (Step S72).

1.5.5 Operation of First Home Appliance History Access Process

Figure 17:
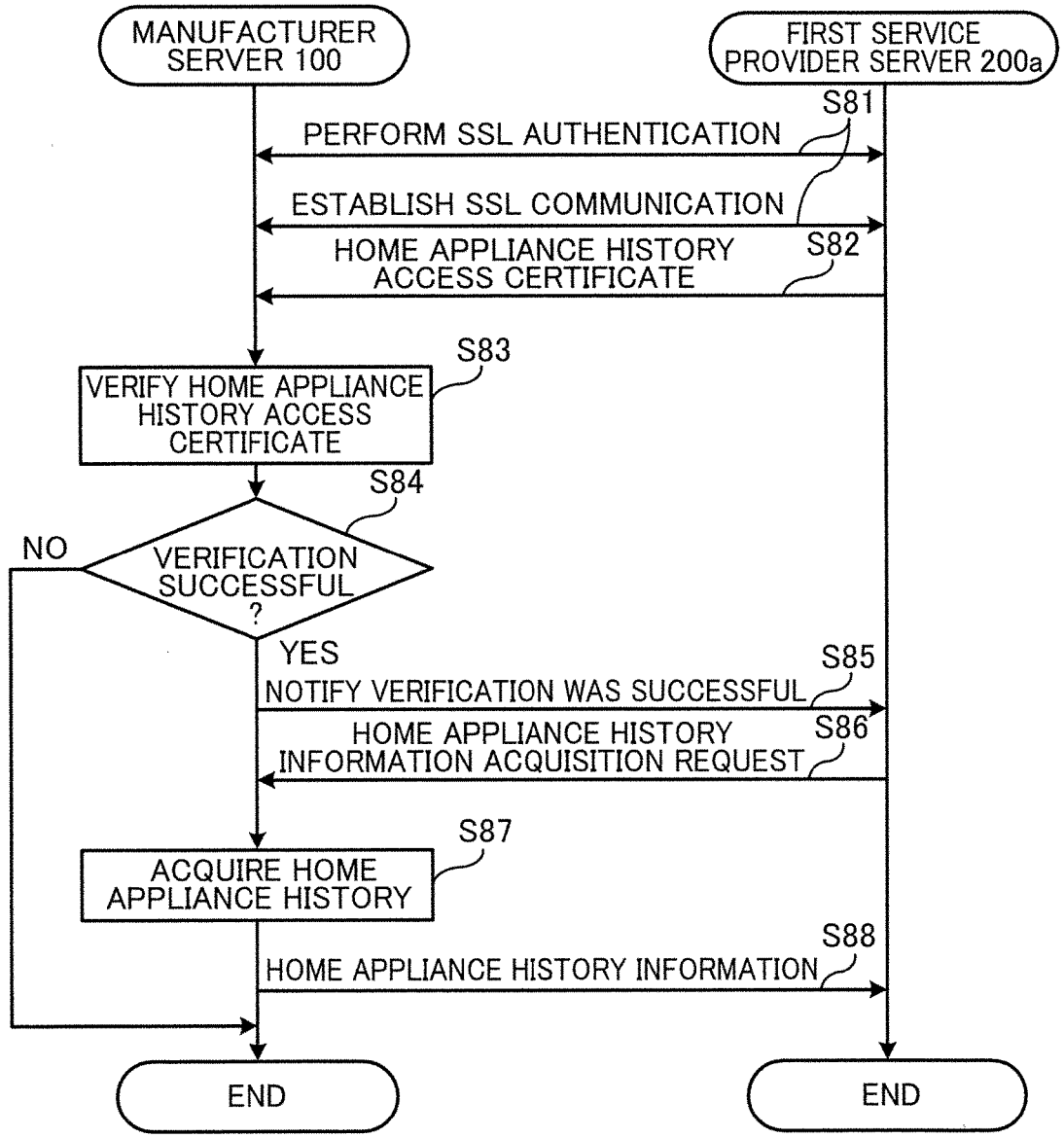
FIG. 17 is a sequence diagram illustrating an operation of a first home appliance history access process in the embodiment of the invention.

FIG. 17 is a sequence diagram illustrating an operation of the first home appliance history access process in the embodiment of the invention.

First of all, the communication unit 205 of the first service provider server 200a performs SSL authentication with respect to the manufacturer server 100, establishes SSL communication, and establishes an encrypted communication path (Step S81).

Subsequently, the manufacturer server access unit 203 of the first service provider server 200a reads out a home appliance history access certificate from the certificate storage unit 204, and transmits the readout home appliance history access certificate to the manufacturer server 100 (Step S82). The communication unit 105 of the manufacturer server 100 receives the home appliance history access certificate transmitted by the first service provider server 200a.

Subsequently, the certificate verification unit 104 of the manufacturer server 100 verifies the received home appliance history access certificate (Step S83).

Subsequently, the control unit 101 judges whether verification of the home appliance history access certificate by the certificate verification unit 104 was successful (Step S84). When it is judged that verification of the home appliance history access certificate has failed (NO in Step S84), the process is terminated.

On the other hand, when it is judged that verification of the home appliance history access certificate was successful (YES in Step S84), the communication unit 105 notifies the first service provider server 200a that verification of the home appliance history access certificate was successful (Step S85). The communication unit 205 of the first service provider server 200a receives a notification that verification of the home appliance history access certificate transmitted by the manufacturer server 100 was successful.

Subsequently, the control unit 201 of the first service provider server 200a selects home appliance history information to be acquired, and transmits, to the manufacturer server 100, a home appliance history information acquisition request indicating a request to acquire the selected home appliance history information (Step S86). The communication unit 105 of the manufacturer server 100 receives the home appliance history information acquisition request transmitted by the first service provider server 200a.

Subsequently, the control unit 101 of the manufacturer server 100 specifies the home appliance history information to be provided to the first service provider server 200a, referring to the access control list, and acquires the specified home appliance history information from the history information DB 102 (Step S87).

When the aforementioned operation is performed, the control unit 101 selects the home appliance history information to be provided to the first service provider server 200*a* as follows, with use of the access control list. The control unit 101 acquires, from the history information DB 102, home appliance history information associated with the home appliance type having the user ID other than the unprovidable user ID, from the home appliance types of which home appliance history information is provided to the first service provider server 200*a*.

Subsequently, the communication unit 105 transmits the acquired home appliance history information to the first service provider server 200*a* (Step S88). The communication unit 205 of the first service provider server 200*a* receives the home appliance history information transmitted by the manufacturer server 100.

Alternatively, the first service provider server 200*a* may acquire home appliance history information that is provided from the home appliance after the point of time when it is set such that home appliance history information is provided by the user. Further alternatively, the first service provider server 200*a* may acquire not only home appliance history information that is provided after the point of time when it is set such that home appliance history information is provided by the user, but also home appliance history information that is provided before the point of time when it is set such that home appliance history information is provided by the user.

1.5.6 Operation of Second Service Provider Registration Process

Figure 18:
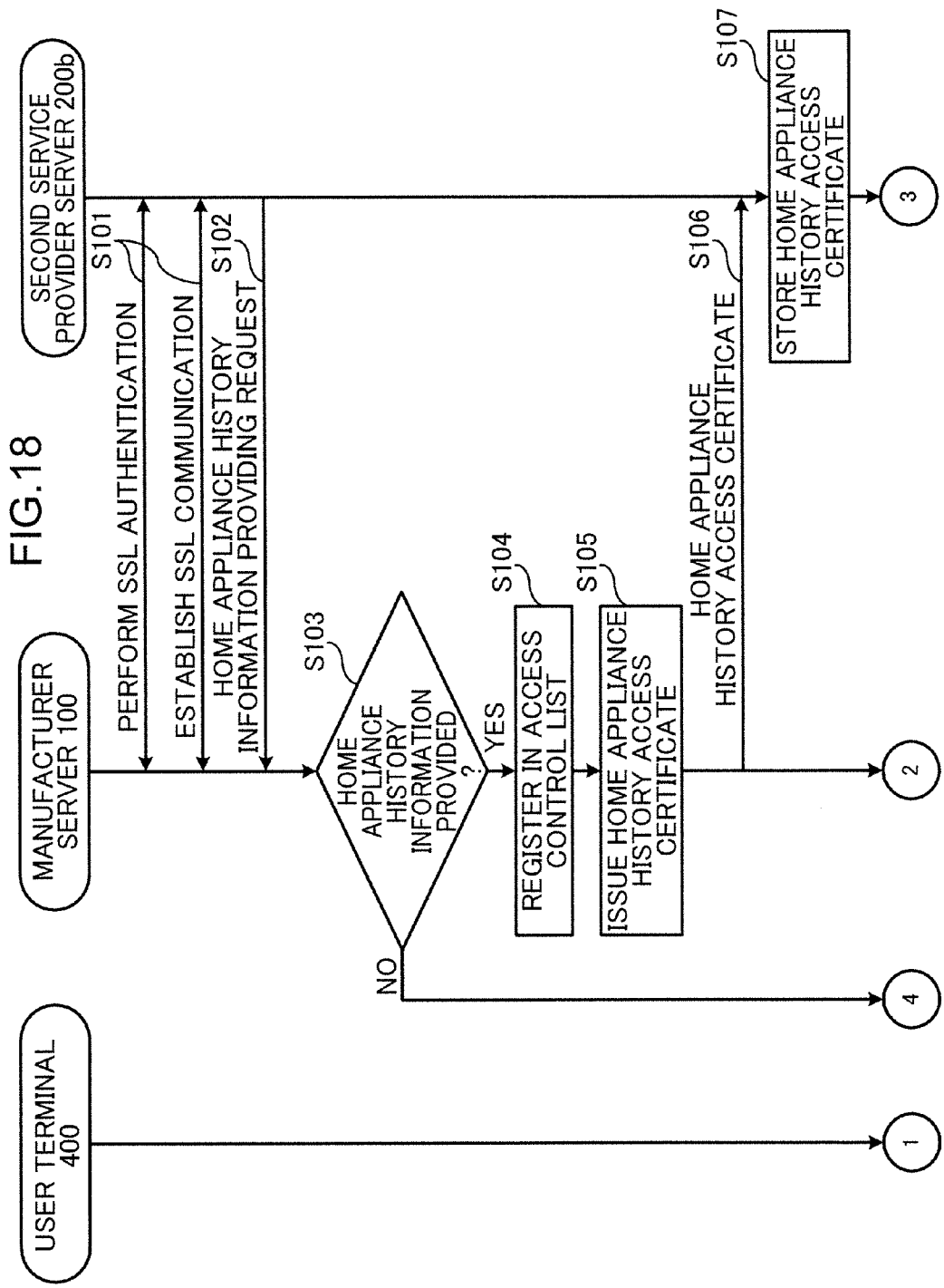
FIG. 18 is a sequence diagram illustrating a first half of an operation of a second service provider registration process in the embodiment of the invention.
Figure 19:
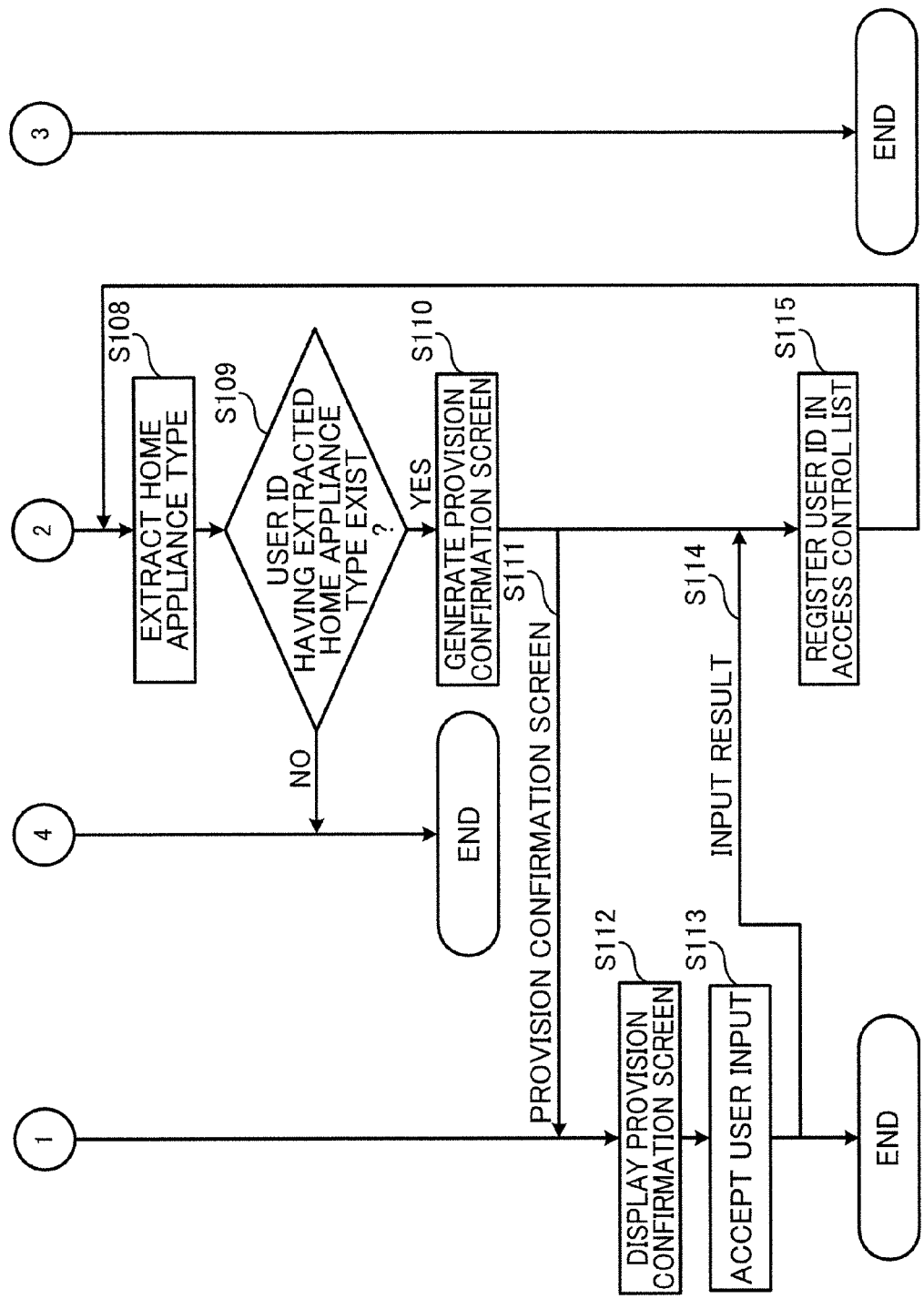
FIG. 19 is a sequence diagram illustrating a second half of the operation of the second service provider registration process in the embodiment of the invention.

FIG. 18 and FIG. 19 are sequence diagrams illustrating an operation of the second service provider registration process in the embodiment of the invention. FIG. 20 is a diagram illustrating an example of an access control list, in which a new service provider is added.

The processes from Step S101 to Step S107 of the second service provider registration process illustrated in FIG. 18 are the same as the processes from Step S11 to Step S17 of the first service provider registration process illustrated in FIG. 10, and therefore, description of the processes from Step S101 to Step S107 is omitted herein.

The control unit 101 of the manufacturer server 100 extracts a home appliance type associated with a newly registered service provider ID from the access control list (Step S108).

Subsequently, the control unit 101 retrieves the user ID having the extracted home appliance type from the history information DB, and judges whether there is the user ID having the extracted home appliance type (Step S109).

In the access control list illustrated in FIG. 20, a service provider (insurance service C) whose service provider ID is "SID_c" is newly registered, and the newly registered service provider is associated with a body composition meter and with a blood pressure meter as the home appliance types of which home appliance history information is acquired. In this case, the control unit 101 extracts, from the access control list, a body composition meter and a blood pressure meter associated with the newly registered service provider ID (SID_c). Then, the control unit 101 retrieves the user ID associated with the extracted body composition meter and the extracted blood pressure meter from the history information DB 102, and judges whether there is the user ID associated with the extracted body composition meter and the extracted blood pressure meter.

When it is judged that there is no user ID having the extracted home appliance type (NO in Step S109), the process is terminated.

On the other hand, when it is judged that there is the user ID having the extracted home appliance type (YES in Step S109), the control unit 101 generates a provision confirmation screen for use in asking the user whether home appliance history information is to be provided to the service provider server associated with the newly registered service provider ID (Step S110). The control unit 101 asks the user whether home appliance history information is to be provided to the service provider, using the provision confirmation screen.

Subsequently, the communication unit 105 transmits the provision confirmation screen generated by the control unit 101 to the user terminal 400 (Step S111). The communication unit 406 of the user terminal 400 receives the provision confirmation screen transmitted by the manufacturer server 100. Alternatively, the provision confirmation screen transmission method may be notified by an electronic mail, or may be notified when the application of the information providing system is activated on the user terminal 400.

Subsequently, the display unit 405 of the user terminal 400 displays the received provision confirmation screen (Step S112).

Subsequently, the input unit 404 accepts user's input as to whether home appliance history information is provided to the service provider server (Step S113).

Subsequently, the communication unit 406 transmits, to the manufacturer server 100, an input result as to whether home appliance history information input by the input unit 404 is provided to the service provider server (Step S114). The communication unit 105 of the manufacturer server 100 receives the input result transmitted by the user terminal 400.

FIG. 21 is a diagram illustrating an example of a provision confirmation screen for use in asking the user whether home appliance history information of an already registered home appliance 300 is to be provided to a newly registered service provider server. On the provision confirmation screen illustrated in FIG. 21, the user who registers a body composition meter and a blood pressure meter in the information providing system 10 is asked whether home appliance history information is to be provided.

As illustrated in FIG. 21, the control unit 101 generates a provision confirmation screen including a newly registered service provider, a home appliance which is already registered, and whose home appliance history information is providable to the newly registered service provider, home appliance history information to be provided from the home appliance to the service provider, and checkboxes with which the user is allowed to select whether home appliance history information is to be provided. The control unit 101 displays the generated provision confirmation screen on the user terminal 400. The user is allowed to select whether home appliance history information is to be provided with respect to each of the home appliances, and to input the selection result through the input unit 404. The input result is transmitted from the user terminal 400 to the manufacturer server 100.

Subsequently, the control unit 101 of the manufacturer server 100 registers the user ID of the user who does not provide home appliance history information in the access control list on the basis of an input result as to whether home appliance history information selected by the user is provided to a service provider (Step S115). When home appliance history information is not provided to a service provider, the control unit 101 registers the user ID in the access control list. On the other hand, when home appliance history information is provided to a service provider, the control unit 101 does not register the user ID in the access control list. As described above, the control unit 101 can discriminate whether user's home appliance history information is to be provided by managing the user ID of the user who does not provide home appliance history information by the access control list.

FIG. 22 is a diagram illustrating an example of an access control list, in which setting as to whether home appliance history information is provided with respect to a newly registered server provider ID is made. The access control list illustrated in FIG. 22 is an example, in which the user whose user ID is "ID 14" has selected that home appliance history information of both of a body composition meter and a blood pressure meter is not provided to the newly registered service i.e. the insurance service C. In this case, in the access control list, "ID14" is registered as the unprovidable user ID associated with the body composition meter and with the blood pressure meter having the newly registered service provider ID "SID_c".

1.6 Modifications of Provision Confirmation Screen

Next, modifications of the provision confirmation screen in the embodiment are described.

1.6.1 First Modification of Provision Confirmation Screen

The control unit 101 may generate a provision confirmation screen on which one user is allowed set whether log information of a new home appliance is transmitted to the computer of an extracted service provider with respect to each of the types of log information.

FIG. 23 is a diagram illustrating a first modification of the provision confirmation screen. As illustrated in FIG. 23, the provision confirmation screen may not accept setting as to whether home appliance history information is provided with respect to each of the home appliances, but may accept setting as to whether home appliance history information is provided with respect to each of the types of home appliance history information.

For instance, when a newly installed home appliance is a body composition meter, it is possible to set whether each of the measurement date, the body weight, and the body fat percentage is to be provided to the service provider of the fitness service A. Further, it is also possible to set whether each of the measurement date, the body weight, and the body fat percentage is to be provided to the service provider of the diet service B.

In this way, it is possible to set whether log information is to be transmitted to the computer of a service provider with respect to each of the types of log information. This is advantageous in finely setting whether log information is to be provided to a service provider.

1.6.2 Second Modification of Provision Confirmation Screen

The provision confirmation screen may include information indicating the number of users who permit transmitting log information of the same home appliance as the new home appliance to the computer of the same service provider as the extracted service provider.

FIG. 24 is a diagram illustrating a second modification of the provision confirmation screen. As illustrated in FIG. 24, the provision confirmation screen may include the number of the other users who provide home appliance history information to a service provider.

In the aforementioned case, the control unit 101 counts the number of user IDs which are associated with the same home appliance type as the type of the newly registered home appliance, referring to the history information DB 102, and counts the number of unprovidable user IDs having a home appliance associated with the service provider ID of the same service provider as the extracted service provider, referring to the access control list. Then, the control unit 101 calculates the number of the other users who provide home appliance history information to the service provider by subtracting the number of unprovidable user IDs from the number of user IDs associated with the same home appliance type as the type of the newly registered home appliance.

The control unit 101 adds the calculated number of the other users who provide home appliance history information to the service provider on the provision confirmation screen.

In this way, it is possible to display information indicating the number of users who permit transmitting log information of the same home appliance as a new home appliance to the computer of the same service provider as the extracted service provider. This allows for the user to determine whether the user permits transmitting log information by checking the number of the other users who permit transmitting log information. Further, the user can use the number of the other users who permit transmitting log information, as information in determining whether the user permits transmitting log information.

1.6.3 Third Modification of Provision Confirmation Screen

The provision confirmation screen may include a setting screen on which one user is allowed to set a time period during which log information of a new home appliance is transmitted to the computer of an extracted service provider.

FIG. 25 is a diagram illustrating a third modification of the provision confirmation screen. As illustrated in FIG. 25, the provision confirmation screen includes a time period during which home appliance history information is provided to a service provider. Specifically, the user is allowed to set not only whether home appliance history information is to be provided to a service provider but also a time period during which home appliance history information is provided to a service provider.

For instance, on the provision confirmation screen illustrated in FIG. 25, when home appliance history information is provided to the fitness service A, setting as to the time period during which home appliance history information is provided is accepted. Then, the user inputs an intended time period during which home appliance history information is provided.

The control unit 101 may transmit, to the user terminal 400, a provision confirmation screen upon lapse of a time period, which is set by the user and during which home appliance history information is provided to the service provider.

In this way, it is possible to set a time period during which log information is provided to a service provider. This makes it possible to provide log information to a service provider during a time period intended by the user.

1.6.4 Fourth Modification of Provision Confirmation Screen

When the number of users who permit transmitting log information to the computer of a specific one of one or more service providers has reached a predetermined number among one or more users, the control unit 101 may provide, to the user terminal 400 (display terminal) of a non-permitting user, a provision confirmation screen on which the non-permitting user who does not permit transmitting log information of a home appliance to the computer of the specific service provider is allowed to set whether log information of the home appliance is transmitted to the computer of the specific service provider, among the one or more users.

Further, the provision confirmation screen may include information indicating that the number of users who permit transmitting log information to the computer of a specific service provider has reached a predetermined number.

FIG. 26 is a diagram illustrating a fourth modification of the provision confirmation screen. As illustrated in FIG. 26, the provision confirmation screen may include the number of users who provide home appliance history information to a service provider.

For instance, when the number of users who provide home appliance history information to a predetermined service provider has reached a predetermined number (e.g. one thousand), the control unit 101 extracts the user ID determined as an unprovidable user ID with respect to the home appliance type associated with the predetermined service provider, referring to the access control list. Then, the control unit 101 provides a provision confirmation screen to the user terminal 400 of the non-permitting user identified by the extracted user ID. When the aforementioned operation is performed, the number of users who permit transmitting log information to the predetermined service provider is displayed on the provision confirmation screen.

In this way, it is possible to provide a provision confirmation screen to the user terminal 400 of a non-permitting user who does not permit transmitting log information of a home appliance to the computer of a specific service provider when the number of users who permit transmitting log information to the computer of the specific service provider has reached a predetermined number. This is advantageous in prompting the user to transmit log information.

Further, the user is allowed to determine whether the user permits transmitting log information by checking the information indicating that the number of users who permit transmitting log information to the computer of a specific service provider has reached a predetermined number.

1.7 Advantageous Effects of Embodiment

The device manufacturer safely and integrally manages various types of user information including history information relating to use of home appliances by the users, and only the permitted information is provided to each of the service providers on the basis of an access control list. The access control list is a list to be managed whether the user provides home appliance history information of a home appliance with respect to each of the service providers. The service provider server can acquire home appliance history information permitted to the service provider server by transmitting a certificate issued by the manufacturer server.

In the aforementioned aspect, when a new home appliance is added to the information providing system, the service provider which intends to acquire log information of the new home appliance is automatically extracted. Then, a display screen, on which the user is allowed to set whether log information of the new home appliance is to be provided to the computer of the extracted service provider, is provided to the display terminal of the user.

According to the aforementioned configuration, each time a new home appliance is added, the user is allowed to set the service provider to which log information of the new home appliance is provided. This makes it possible to prevent providing log information of a new home appliance to a service provider which is not expected to the user, without relying on the user's judgment. Further, each time a new home appliance is added, a service provider associated with the new home appliance is selected. This makes it possible to reduce the user's burden in setting. Further, each time a new home appliance is added, the user is asked to judge whether log information is to be provided. This makes it possible to prevent a case in which it is impossible to discriminate between home appliances registered whether log information is to be provided and home appliances unregistered whether log information is to be provided due to an increase in the number of registered home appliances, and in which setting as to whether providing log information is erroneously registered.

Further, in the aforementioned aspect, when a computer of a new service provider is added to the information providing system, a display screen, on which the user is allowed to set whether log information is to be provided to the new service provider with respect to a home appliance of which acquisition of log information is intended by the new service provider, is provided to the display terminal of the user.

According to the aforementioned configuration, each time a new service provider is added, the user is allowed to set whether log information of a home appliance is to be provided to the new service provider. This makes it possible to prevent providing log information of a home appliance to a new service provider which is not expected to the user, without relying on the user's judgment. Further, each time a new service provider is added, a home appliance associated with the new service provider is selected. This makes it possible to reduce the user's burden in setting. Further, each time a new service provider is added, the user is allowed to judge whether log information is to be provided. This makes it possible to prevent a case in which it is impossible to discriminate between home appliances registered whether log information is to be provided and home appliances unregistered whether log information is to be provided due to an increase in the number of registered home appliances, and in which setting as to whether providing log information is erroneously registered.

2. Types of Cloud Services in the Embodiment of the Invention

The techniques described in the foregoing aspects can be implemented in the following types of cloud services. However, the types of cloud services in which the techniques described in the foregoing aspects can be implemented are not limited to the above.

(Service Type 1: a Cloud Service Provided by a Datacenter of the Applicant's Company)

FIG. 27 is a diagram illustrating an overview of services to be provided by an information providing system of service type 1 (a cloud service provided by a datacenter of the applicant's company). In this type, a service provider 1200 acquires information from a group 1000, and provides services to the user. In this type, the service provider 1200 has the functions of a datacenter operating company. Specifically, the service provider 1200 owns a cloud server 1110 which manages big data. Therefore, actually, a datacenter operating company does not exist.

In this type, the service provider 1200 operates and manages a datacenter (cloud server) 2030. Further, the service provider 1200 manages an operating system (OS) 2020 and an application 2010. The service provider 1200 provides services with use of the OS 2020 and the application 2010 to be managed by the service provider 1200 (see the arrow 2040).

(Service Type 2: a Cloud Service Utilizing IaaS)

Figure 28:
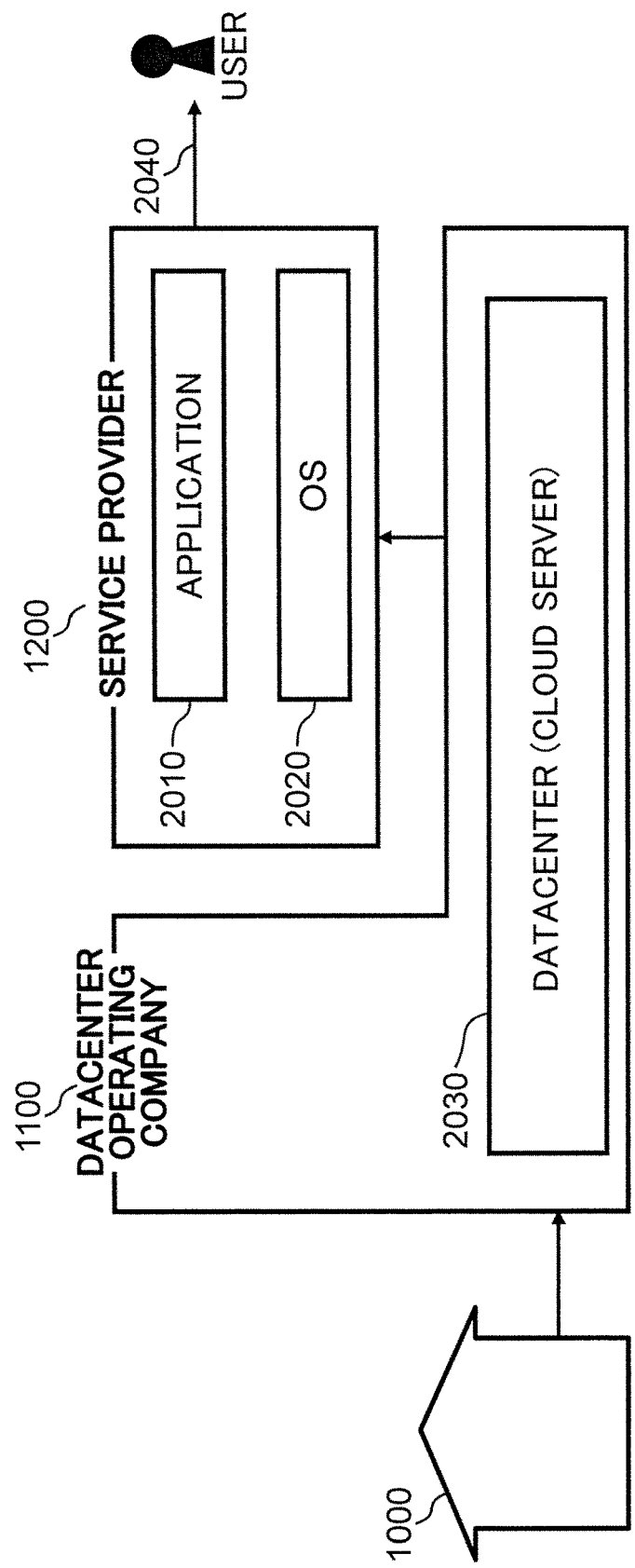
FIG. 28 is a diagram illustrating an overview of services to be provided by an information managing system of service type 2 (a cloud service utilizing IaaS)

FIG. 28 is a diagram illustrating an overview of services to be provided by an information providing system of service type 2 (a cloud service utilizing IaaS). IaaS stands for Infrastructure as a Service. IaaS is a cloud service providing model configured to provide a foundation, based on which a computer system is configured and operated, as services via the Internet.

In this type, a datacenter operating company 1100 operates and manages a datacenter (cloud server) 2030. Further, a service provider 1200 manages an OS 2020 and an application 2010. The service provider 1200 provides services with use of the OS 2020 and the application 2010 to be managed by the service provider 1200 (see the arrow 2040).

(Service Type 3: a Cloud Service Utilizing PaaS)

Figure 29:
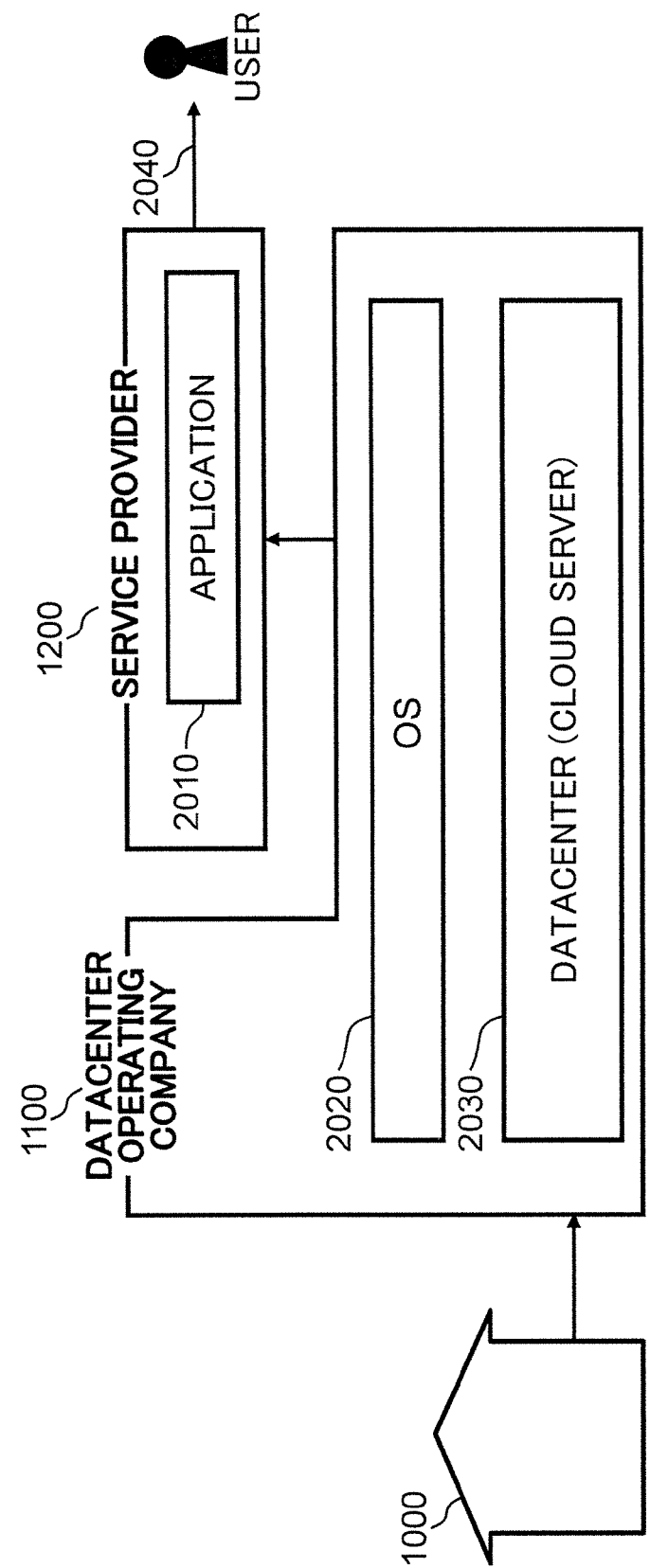
FIG. 29 is a diagram illustrating an overview of services to be provided by an information managing system of service type 3 (a cloud service utilizing PaaS)

FIG. 29 is a diagram illustrating an overview of services to be provided by an information providing system of service type 3 (a cloud service utilizing PaaS). PaaS stands for Platform as a Service. PaaS is a cloud service providing model configured to provide a platform, based on which a software is configured and operated as services via the Internet.

In this type, a datacenter operating company 1100 manages an OS 2020, and operates and manages a datacenter (cloud server) 2030. Further, a service provider 1200 manages an application 2010. The service provider 1200 provides services with use of the OS 2020 to be managed by the datacenter operating company 1100 and the application 2010 to be managed by the service provider 1200 (see the arrow 2040).

(Service Type 4: a Cloud Service Utilizing SaaS)

Figure 30:
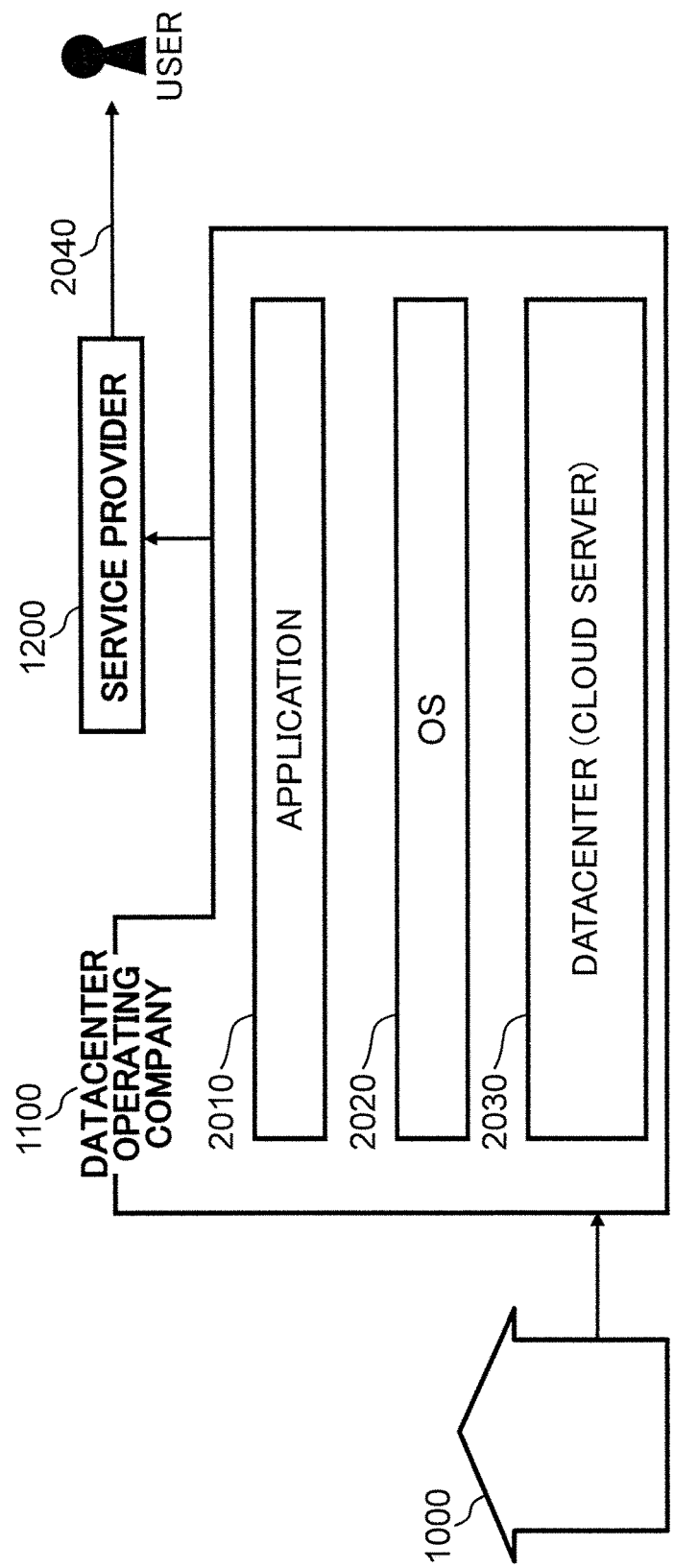
FIG. 30 is a diagram illustrating an overview of services to be provided by an information managing system of service type 4 (a cloud service utilizing SaaS).

FIG. 30 is a diagram illustrating an overview of services to be provided by an information providing system of service type 4 (a cloud service utilizing SaaS). SaaS stands for Software as a Service. A cloud service utilizing SaaS is e.g. a cloud service providing model having functions, with which the user such as a company or a person who does not own a datacenter (a cloud server) is allowed to use an application provided by a platform provider who owns the datacenter (a cloud server) via a network such as the Internet.

In this type, a datacenter operating company 1100 manages an application 2010, manages an OS 2020, and operates and manages a datacenter (a cloud server) 2030. Further, a service provider 1200 provides services, with use of the OS 2020 and the application 2010 to be managed by the datacenter operating company 1100 (see the arrow 2040).

As described above, in any of the cloud service types, the service provider 1200 provides services. Further, for instance, a service provider or a datacenter operating company may develop an OS, an application, or a database for big data by themselves, or may outsource the development to a third party.

3. Modifications

The invention has been described on the basis of the embodiment. It is needless to say that the invention is not limited by the embodiment. The following modifications are included in the invention.

(1) In the embodiment, the manufacturer server of the device manufacturer may collect not only home appliance history information of home appliances manufactured by the device manufacturer but also home appliance history infatuation of home appliances manufactured by device manufacturers other than the device manufacturer.

(2) In the embodiment, the home appliances 300 directly upload home appliance history information to the manufacturer server 100. Alternatively, home appliance information may be updated via the user terminal 400. In this case, a network between the home appliances 300 and the user terminal 400 may be a local communication channel, or may be a proximity communication channel such as NFC (Near Field Communication).

(3) In the embodiment, the home appliance ID is the name of a home appliance. Alternatively, the home appliance ID may be the serial number or the model number of a home appliance. Further alternatively, the home appliance ID may be a combination of the name, the serial number, and the model number of a home appliance.

(4) In the embodiment, the control unit asks the user whether home appliance history information is to be provided. Alternatively, the control unit may ask the user whether home appliance history information is to be provided by adding personal information of the user.

(5) In the embodiment, the user ID of the user who does not permit providing home appliance history information is managed. Alternatively, the user ID of the user who permits providing home appliance history information may be managed.

(6) In the embodiment, the manufacturer server issues a home appliance history access certificate. The invention is not limited to the above. Alternatively, a certificate issuing center (not illustrated) may issue a home appliance history access certificate. In this case, the manufacturer server requests the certificate issuing center to issue a home appliance history access certificate, and the home appliance history access certificate issued by the certificate issuing center may be transmitted to the service provider server.

(7) In the embodiment, the access control list sets whether home appliance history information is to be provided with respect to each of the home appliances. The invention is not limited to the above. For instance, the access control list may be configured such that home appliance history information is provided with respect to each of the types of home appliance history information to be obtained from the home appliances. For instance, when the home appliance is a body composition meter, it is possible to set such that information about the body weight can be provided but information about the body fat percentage cannot be provided among a plurality of types of home appliance history information.

(8) Each of the aforementioned devices is, for instance, a computer system constituted by a microprocessor, an ROM (Read Only Memory), an RAM (Random Access Memory), a hard disk unit, a display unit, a keyboard, and a mouse. The RAM or the hard disk unit stores a computer program. The functions of each of the devices are accomplished by causing a microprocessor to operate in accordance with a computer program. The computer program is configured by combining a plurality of instruction codes indicating commands to a computer in order to accomplish a predetermined function.

(9) A part or all of the constituent elements constituting each of the devices may be configured by one system LSI (Large Scale Integration). The system LSI is an ultra-multifunctional LSI fabricated by integrating a plurality of components on one chip. Specifically, a system LSI is a computer system constituted by a microprocessor, an ROM, and an RAM. The RAM stores a computer program thereon. The functions of the system LSI are accomplished by causing a microprocessor to operate in accordance with a computer program.

Further, each of the constituent elements constituting each of the devices may be individually configured into a one-chip device, or a part or all of the constituent elements may be configured into a one-chip device.

Further, in this example, the integrated circuit is a system LSI. The integrated circuit may also be called as an IC (Integrated Circuit), an LSI, a super LSI, or an ultra LSI depending on the degree of integration of the circuit. Further, the circuit integration method is not limited to an LSI method. The integrated circuit may be implemented by a dedicated circuit or a general-purpose processor. Further, an FPGA (Field Programmable Gate Array) capable of programming after fabricating an LSI, or a reconfigurable processor capable of reconfiguring connection or setting of circuit cells within an LSI after fabricating the LSI may also be used.

Further, if an integration circuit technology substantially equivalent to the LSI technology is developed in the future by the progress of a semiconductor technology or by another technology derived from the semiconductor technology, it is needless to say that the functional blocks are integrated by using the technology. An example of the integrated circuit technology as a substitute of the LSI technology may be application of a bio-technology.

(10) A part or all of the constituent elements constituting each of the aforementioned devices may be constituted by an IC card detachably mounted on each of the devices, or by a single module. The IC card or the module is a computer system constituted by a microprocessor, an ROM, and an RAM. The IC card or the module may include the aforementioned ultra-multi-functional LSI. The functions of the IC card or the module are accomplished by causing a microprocessor to operate in accordance with a computer program. The IC card or the module may have a tampering resistance.

(11) The invention may be directed to the aforementioned methods. Further, the invention may be directed to a computer program that implements one of these methods on a computer, or may be directed to digital signals constituted by a computer program.

Further, the invention may be directed to a computer-readable recording medium recorded with the computer program or the digital signals such as a flexible disk, a hard disk, a CD-ROM, an MO, a DVD, a DVD-ROM, a DVD-RAM, a BD (Blu-ray (registered trademark) Disc), or a semiconductor memory. Further, the invention may be directed to the digital signals recorded on one of these recording media.

Further, the invention may be directed to a configuration, in which the computer program or the digital signals are transmitted via a telecommunication line, a wireless communication line, a wired communication line, a network as represented by the Internet, or data broadcasting.

Further, the invention may be directed to a computer system provided with a microprocessor and a memory, wherein the memory stores the aforementioned computer program, and the microprocessor is operated in accordance with the computer program.

Further, the invention may be implemented by another independent computer system by recording the computer program or the digital signals on the recording medium for transferring, or by transferring the computer program or the digital signals via the network or the like.

(12) The invention may be combination of the embodiment and any one of the modifications.

INDUSTRIAL APPLICABILITY

The information provision method of the invention is capable of preventing providing log information of a new home appliance to a service provider which is not expected to the user, and accordingly, is useful as an information provision method for use in an information providing system configured to collect log information from one or more home appliances of one or more users via a first network, and to transmit the log information to a computer of one or more service providers via a second network.

The invention claimed is:

1. An information provision method for use in an information providing server, the information provision method comprising:

accumulating, in a first database, a first identifier identifying each of one or more service providers, and first device information indicating an electrical device to be designated by each of the one or more service providers in association with each other;

accumulating, in a second database, a second identifier identifying each of one or more users, and second device information indicating an electrical device to be used by the one or more users in association with each other;

extracting the service provider associated with the first device information when the second device information is updated by addition of a new electrical device to be used by one user from among the one or more users, and when the new electrical device is included in the electrical devices indicated by the first device information;

generating first screen information indicating a setting screen, on which the one user is allowed to set whether operation history information of the new electrical device is transmitted to a computer of the extracted service provider, the setting screen including (i) the extracted service provider, (ii) the new electrical device, (iii) the operation history information provided from the new electrical device to the service provider, and (iv) an input field to accept an input by the one user as to whether or not the new electrical device provides the operation history information to the extracted service provider;

transmitting the generated first screen information to a display terminal of the one user;

receiving, from the display terminal, an input result about the input by the one user as to whether or not the new electrical device provides the operation history information to the extracted service provider;

registering, in the first database, information indicating whether or not the new electrical device provides the operation history information to the extracted service provider by associating the first identifier of the extracted service provider with the first device information of the new electrical device on the basis on the received input result;

collecting one or more pieces of operation history information from one or more electrical devices of the one user via a first network; and referring to the first database, and transmitting, among the collected one or more pieces of operation history information, operation history information permitted by the one user to be transmitted to a computer of the one or more service providers to the computer of the one or more service providers via a second network.

2. The information provision method according to claim 1, wherein it is judged whether a same electrical device as the new electrical device included in the updated second device information is included in the electrical devices indicated by the first device information, and when it is judged that the same electrical device as the new electrical device is included in the electrical devices indicated by the first device information, the service provider associated with the first device information is extracted.

3. The information provision method according to claim 1, wherein
when the first database is updated by addition of a new service provider, and when an electrical device to be designated by the new service provider is included in the electrical devices indicated by the second device information, a user associated with the second device information is extracted from the one or more users, and
second screen information indicating a setting screen, on which the associated user is allowed to set whether operation history information of the electrical device to be designated by the new service provider is transmitted to a computer of the new service provider, is provided to a display terminal of the associated user.

4. The information provision method according to claim 1, wherein
the first screen information includes information indicating the number of users who permit transmitting operation history information of a same electrical device as the new electrical device to the computer of the same service provider as the extracted service provider.

5. The information provision method according to claim 1, wherein
when a number of users who permit transmitting the operation history information to a computer of a specific one of the one or more service providers has reached a predetermined number among the one or more users, third screen information indicating a setting screen, on which a non-permitting user who does not permit transmitting the operation history information of the electrical device to the computer of the specific service provider among the one or more users is allowed to set whether the operation history information of the electrical device is transmitted to the computer of the specific service provider, is provided to a display terminal of the non-permitting user.

6. The information provision method according to claim 5, wherein
the third screen information includes information indicating that the number of users who permit transmitting the operation history information to the computer of the specific service provider has reached the predetermined number.

7. The information provision method according to claim 1, wherein
the first screen information indicates a setting screen, on which the one user is allowed to set whether operation history information of the new electrical device is transmitted to the computer of the extracted service provider with respect to each of types of the operation history information.

8. The information provision method according to claim 1, wherein
the first screen information includes a setting screen, on which the one user is allowed to set a time period during which the operation history information of the new electrical device is transmitted to the computer of the extracted service provider.

9. An information provision method for use in an information providing server, the information provision method comprising:
accumulating, in a first database, a first identifier identifying each of one or more service providers, and first device information indicating an electrical device to be designated by each of the one or more service providers in association with each other;
accumulating, in a second database, a second identifier identifying each of one or more users, and second device information indicating an electrical device to be used by the one or more users in association with each other;
extracting a user associated with the second device information from the one or more users when the first database is updated by addition of a new service provider, and when an electrical device to be designated by the new service provider is included in the electrical devices indicated by the second device information; and
generating first screen information indicating a setting screen, on which the associated user is allowed to set whether operation history information of the electrical device to be designated by the new service provider is transmitted to a computer of the new service provider, the setting screen including (i) the new service provider, (ii) the electrical device to be designated by the new service provider, (iii) the operation history information provided from the electrical device to the new service provider, and (iv) an input field to accept an input by the associated user as to whether or not the electrical device provides the operation history information to the new service provider;
transmitting the generated first screen information to a display terminal of the associated user;
receiving, from the display terminal, an input result about the input by the associated user as to whether or not the electrical device provides the operation history information to the new service provider;
registering, in the first database, information indicating whether or not the electrical device provides the operation history information to the new service provider by associating the first identifier of the new service provider with the first device information of the electrical device to be designated by the new service provider on the basis on the received input result;
collecting one or more pieces of operation history information from one or more electrical devices of the associated user via a first network; and
referring to the first database, and transmitting, among the collected one or more pieces of operation history information, operation history information permitted by the associated user to be transmitted to a computer of the one or more service providers to the computer of the one or more service providers via a second network.

* * * * *